United States Patent [19]

Bohen et al.

[11] Patent Number: 5,096,947
[45] Date of Patent: Mar. 17, 1992

[54] ORGANIC PEROXIDE AND ORGANIC SULFIDE ANTIOXIDANT COMPOSITION

[75] Inventors: Joseph M. Bohen, King of Prussia, Pa.; Edward P. Hibbard, Elma; Vasanth R. Kamath, Amherst, both of N.Y.; James L. Reilly, Towamencin, Pa.

[73] Assignee: Atochem North America, Inc., Philadelphia, Pa.

[21] Appl. No.: 698,235

[22] Filed: May 6, 1991

Related U.S. Application Data

[63] Continuation of Ser. No. 429,682, Oct. 31, 1989, abandoned.

[51] Int. Cl.$^5$ ................................................ C08K 5/36
[52] U.S. Cl. ..................................... 524/58; 252/406; 524/368; 524/392; 524/291; 525/387
[58] Field of Search ............... 524/368, 392, 303, 302, 524/304, 333, 58; 525/387; 252/406

[56] References Cited

U.S. PATENT DOCUMENTS

| | | | |
|---|---|---|---|
| T985,004 | 8/1979 | Paul, 3rd | 524/392 |
| 2,522,590 | 9/1950 | Vaughan et al. | 204/158 |
| 2,995,539 | 8/1961 | Barker et al. | 524/368 |
| 3,293,209 | 12/1966 | Baldwin | 524/333 |
| 3,301,816 | 1/1967 | Burgess | 524/392 |
| 3,652,680 | 3/1972 | Buchholz | 524/392 |
| 3,772,246 | 11/1973 | Buchholz | 524/392 |
| 3,773,556 | 11/1973 | Rowland et al. | 525/387 |
| 4,028,332 | 6/1977 | Needham et al. | 524/289 |
| 4,833,209 | 5/1989 | Beijeveld et al. | 525/837 |

FOREIGN PATENT DOCUMENTS

| | | |
|---|---|---|
| 0177784 | 4/1986 | European Pat. Off. |
| 1268409 | 4/1968 | Fed. Rep. of Germany |
| 1694210 | 4/1971 | Fed. Rep. of Germany |
| 966929 | 8/1964 | United Kingdom |
| 981346 | 1/1965 | United Kingdom |
| 1015797 | 1/1966 | United Kingdom |

OTHER PUBLICATIONS

"ANTEC 88 Conference", Apr. 18-21, 1988, Atlanta, Ga.
J. R. Shelton: "Organic Sulfur Compounds as Preventative Antioxidants", *Developments in Polymer Stabilization*-4, 23-69, Gerald Scott, ed., (1981).
Modern Plastics Encyclopedia, 88, 127-128, (1988).
The Vanderbilt Rubber Handbook, 308-318, 528-532, (1978).

*Primary Examiner*—Veronic P. Hoke
*Attorney, Agent, or Firm*—Panitch Schwarze Jacobs & Nadel

[57] ABSTRACT

A composition comprises a thermoplastic or polymeric resin; an organic peroxide; and an organic sulfide antioxidant represented by Formula I, II or III:

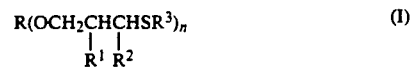

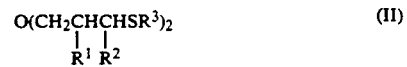

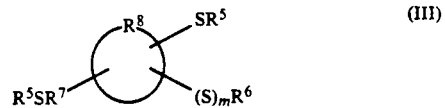

wherein m, n, r, $R^1$, $R^2$, $R^3$, $R^5$, $R^6$, $R^7$ and $R^8$ are as set forth in the Summary of the Invention.

25 Claims, No Drawings

ORGANIC PEROXIDE AND ORGANIC SULFIDE ANTIOXIDANT COMPOSITION

This application is a continuation of the application Ser. No. 07/429,682 filed Oct. 31, 1989, now abandoned.

FIELD OF THE INVENTION

The present invention is related to compositions for stabilizing and crosslinking polymers and polymer blends.

BACKGROUND OF THE INVENTION

The use of organic peroxides to crosslink (i.e., vulcanize) a wide variety of polymer resins is well known in the art.

It is also known to stabilize polymer compositions, including crosslinked polymer compositions against oxidative degradation through the incorporation of low concentrations of antioxidant compounds in the compositions. Oxidative degradation is a process involving the initiation, propagation and termination of free radicals leading to polymeric oxidation. For example, in *Modern Plastics Encyclopedia*, 88, pp. 127-128, 1988, it is disclosed that during the propagation phase, radicals react with oxygen to form peroxy and alkoxy radicals which abstract hydrogen from the polymer chain to form unstable hydroperoxides, alcohols, and new hydrocarbon free radicals. These free radicals can once again combine with oxygen to continue this cycle. Such degradation normally continues until a termination reaction occurs. Typically, as the degradation cycle occurs, a loss in tensile and elongation properties of the crosslinked system with time is observed. This loss is heightened at elevated temperatures.

Stabilization of polymeric compositions from the deleterious effects of oxidation may be achieved by the addition thereto of antioxidants which provide increased opportunities for termination reactions and/or prevent the formation of free radicals. Conventionally, a mixture of primary and secondary antioxidants are used in order to stabilize polymer compositions. The combination of primary and secondary antioxidants may be synergistic, i.e., the combination of the two is more effective than the individual components.

Primary antioxidants are those that scavenge free radicals and inhibit oxidation via the action of chain propagating radicals. Sterically hindered phenols, hindered amine light stabilizers, quinolines and secondary amines are commonly used primary antioxidants.

Secondary antioxidants function by decomposing peroxides and/or hydroperoxides into nonradical products. Commonly used secondary antioxidants include compounds containing phosphorus and sulfur.

Certain organic sulfides have been used as antioxidants and stabilizers in polymer compositions. For example, U.S. Pat. Nos. 3,652,680 and 3,772,246 teach the use of cycloalkane sulfides as antioxidants in non-crosslinked polyolefin resin compositions. Likewise, European Patent Application Publication No. 177784, published Apr. 16, 1986, discloses the use of cycloalkane bis(alyklsulfides) as ultraviolet light stabilizers in polyolefin resins. However, the use of such organic sulfide antioxidants in crosslinked polyolefins has heretofore not been known in the art.

Organic peroxides are generally described as oxidizing agents and antioxidants are known as peroxide decomposers. Therefore, it would be expected that combinations or blends of peroxides and antioxidants would be highly unstable. It is also well known that antioxidants can act as radical "traps". Thus, during crosslinking reactions, one would expect the crosslinking efficiency of the peroxide to be significantly reduced by the presence of an antioxidant. For example, S. C. Martens' article on chemically crosslinked polyethylene (*The Vanderbilt Rubber Handbook*, pp. 308-318, 1978), describes the effects of antioxidants on the crosslinking efficiency of organic peroxides. This reference teaches that antioxidants, particularly the phenolic-type antioxidants, have a significant detrimental effect on the crosslinking efficiency of peroxides. Similarly, results reported in *The Vanderbilt Rubber Handbook*, pp. 528-532, 1978, teach that the inclusion of antioxidants in peroxide crosslinked polymers and elastomers (e.g., EPM, EPDM) leads to reduced initial tensile properties. Thus, it would be expected that the inclusion of commercial antioxidants in polymeric and elastomeric resins crosslinked with a peroxide would detrimentally effect the peroxide.

Accordingly, it can be seen that there is a need for compositions which will effectively stabilize and crosslink polyolefins, allowing one to obtain good initial properties and property retention upon aging without adversely effecting the crosslinking efficiency of the peroxide.

SUMMARY OF THE INVENTION

The present invention is a composition comprising a blend of an organic peroxide and an organic sulfide antioxidant. These compositions are thermally stable under normal storage temperatures (e.g., at or below 50° C.) and are particularly useful for crosslinking polymeric, elastomeric and thermoplastic resins. Excellent aging and antioxidant properties are obtained in the resins crosslinked with the present compositions without sacrificing the crosslinking efficiency of the peroxide by virtue of the organic sulfide antioxidant component of the blend.

The present invention is directed to a composition comprising an organic peroxide and of an organic sulfide antioxidant having a Formula I, II or III:

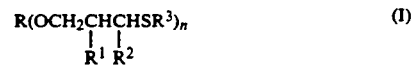 (I)

 (II)

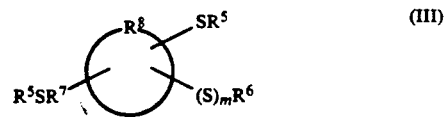 (III)

wherein:
m is 0 or 1;
n is an integer of 2 to 15;
R is a substituted or unsubstituted alkyl group of 2 to 30 carbons, a substituted or unsubstituted cycloalkyl group of 5 to 20 carbons, a substituted or unsubstituted alkyl group of 2 to 30 carbons where any of up to 6 carbon atoms are replaced with an O or S heteroatom, a substituted or unsubstituted cycloalkyl group of 5 to 20 carbons where any of up to 6 carbon atoms are replaced with an O or S heteroatom, with the proviso that the heteroatoms must be separated from each other and from the portion of the compound to which the R group is bonded by at least one carbon atom, the substituents for R being —OH, —SR$^4$ or —OR$^4$, wherein R$^4$ is an alkyl group of 1 to 30 carbons or a cycloalkyl group of 5 to 20 carbons;

R$^1$ and R$^2$ are independently H or an alkyl group of 1 to 4 carbons;

R$^3$ is an alkyl group of 1 to 24 carbons or a cycloalkyl group of 5 to 20 carbons;

R$^5$ is an alkyl group of 1 to 24 carbons;

R$^6$ is H or an alkyl group of 1 to 24 carbons, with the provisos that when m=0, R$^6$ is H or an alkyl group of 1 to 7 carbons and when m=1, R$^6$ is an alkyl group of 1 to 24 carbons;

R$^7$ is a direct bond or an alkylene group of 1 to 4 carbons; and

R$^8$ is a monocyclic, bicyclic or tricyclic cycloalkyl group of 5 to 16 carbons.

DETAILED DESCRIPTION OF THE PREFERRED EMBODIMENTS

The present invention is directed to compositions comprising a blend of an organic peroxide and an organic sulfide antioxidant. The present blends are useful for crosslinking polymeric and thermoplastic resins. The resulting crosslinked resins are stable both during initial processing and upon aging. The use of the organic sulfide antioxidants does not adversely affect the crosslinking efficiency of the peroxides in the resin and provides good aging property retention.

The present invention also comprises a process of making crosslinked polymeric compositions comprising adding to the resin a composition comprising an organic peroxide and an organic sulfide antioxidant, and heat curing at a temperature and for a time sufficient to obtain the desired degree of crosslinking, as well as the crosslinked compositions produced thereby.

The organic peroxides which are useful in the present invention are those which generate free radicals upon thermal decomposition. These free radicals facilitate the crosslinking reaction. One skilled in the art will be able to select the proper organic peroxide for specific crosslinking applications, and therefore, the organic peroxides which may be used in the present invention are not limited. A detailed description of free radical-producing organic peroxides is disclosed in *Encyclopedia of Chemical Technology*, 3rd edition, vol. 17, pp. 27-90, 1982, incorporated herein by reference.

The organic peroxides used in the present compositions include, e.g., peroxyketals, dialkyl peroxides, peroxyesters, monoperoxy carbonates, solid peroxydicarbonates and diacyl peroxides. Preferably, the peroxyketals and dialkyl peroxides are used in the present blends.

Appropriate dialkyl peroxides which may be used in the present invention may be represented by the following structures:

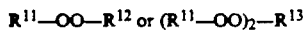

wherein R$^{11}$ and R$^{12}$ can be the same or different and are a substituted or unsubstituted tertiaryalkyl group of 4 to 24 carbons, where R$^{13}$ is a substituted or unsubstituted di-tertiary alkylene diradical of 7 to 18 carbons, substituted or unsubstituted alkenylene diradical of 8 to 18 carbons, substituted or unsubstituted alkynylene diradical of 8 to 18 carbons or substituted or unsubstituted arylene bis(alkylene) diradical of 12 to 18 carbons. Independent substituents for R$^{11}$, R$^{12}$ and R$^{13}$ are chlorine, bromine, an alkyl group of 1 to 4 carbons, an alkoxy group of 1 to 4 carbons, hydroxy and phenyl.

Useful dialkyl peroxides include, e.g., dicumyl peroxide, di-t-butyl peroxide, t-butyl cumyl peroxide, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3, 2,5-dimethyl-2,5-di(t-amylperoxy)hexyne-3, alpha,alpha'-di[(t-butylperoxy)isopropyl]benzene, di-t-amyl peroxide, and 1,3,5-tri[(t-butylperoxy)isopropyl]benzene. However, other suitable dialkyl peroxides will be evident to one skilled in the art, based upon the present disclosure.

Exemplary diperoxyketals useful in the present invention may be represented by the following structure:

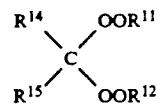

wherein R$^{14}$ and R$^{15}$ may be the same or different and are a substituted or unsubstituted alkyl group of 1 to 18 carbons; R$^{14}$ and R$^{15}$ may further be bonded together to form a substituted or unsubstituted alkylene diradical of 1 to 18 carbons; R$^{11}$ and R$^{12}$ have the same definition as set forth above, and may further be bonded together to form a substituted or unsubstituted di-tertiary alkylene diradical of 7 to 18 carbons; the independent substituents for R$^{14}$ and R$^{15}$ are an alkyl group of 1 to 4 carbons, an alkoxyl group of 1 to 4 carbons, hydroxy, bromine, chlorine, phenyl, an alkoxycarbonyl group of 2 to 6 carbons and an alkoxycarbonylalkyl group of 3 to 6 carbons.

Useful diperoxyketals include, e.g., 1,1-di(t-butylperoxy)-3,3,5-trimethylcyclohexane, 1,1-di(t-butylperoxy)cyclohexane, n-butyl 4,4-di(t-butylperoxy)valerate, ethyl 3,3-di(t-amylperoxy)butyrate, 2,2-di(t-amylperoxy)propane, 2,2-di(t-butylperoxy)propane, 3,6,6,9,9-pentamethyl-3-n-butyl-1,2,4,5-tetraoxacyclononane and 3,6,6,9,9-pentamethyl-3-ethoxycarbonylmethyl-1,2,4,5-tetraoxacyclononane. However, other diperoxyketals useful in the present invention will be evident to one skilled in the art based upon the present disclosure.

Exemplary diacyl peroxides useful in the present compositions may be represented by the following structure:

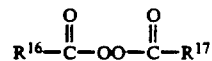

wherein R$^{16}$ and R$^{17}$ may be the same or different and are a primary unsubstituted or substituted alkyl group of 8 to 20 carbons or unsubstituted or substituted aryl group of 6 to 12 carbons, the R$^{16}$ and R$^{17}$ substituents being chlorine, bromine, hydroxy, phenyl, an alkyl group of 1 to 4 carbons, an alkoxy group of 1 to 4 carbons and carboxy.

Useful diacyl peroxides include, e.g., 2,4-dichlorobenzoyl peroxide, benzoyl peroxide and dilauroyl peroxide. However, other diacyl peroxides useful in the present invention will be evident to one skilled in the art based upon the present disclosure.

Exemplary monoperoxy carbonates useful in the present invention may be represented by the following structure:

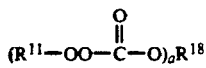

wherein $R^{11}$ has the same definition as set forth above, a is 1 or 2, and when a=1, $R^{18}$ is a substituted or unsubstituted alkyl group of 1 to 18 carbons, and when a=2, $R^{18}$ is a substituted or unsubstituted alkylene group of 2 to 15 carbons, wherein the substituents are chlorine, bromine, an alkyl group of 1 to 4 carbons, an alkoxy group of 1 to 4 carbons and phenyl.

Useful monoperoxycarbonates include, for example, OO-t-butyl O(2-ethylhexyl) monoperoxycarbonate, OO-t-butyl O-isopropyl monoperoxycarbonate and OO-t-amyl O-sec-butyl monoperoxycarbonate. Other monoperoxycarbonates useful in the present invention will be evident to one skilled in the art based upon the present disclosure.

Peroxyesters may also be used in the blends of the present invention. Exemplary peroxyesters may be represented by the following structure:

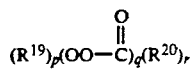

wherein p, q and r independently are 1, 2 or 3; when p, q and r each is 1, $R^{19}$ is an unsubstituted or substituted alkyl group of 4 to 24 carbons and $R^{20}$ is a primary alkyl group of 1 to 18 carbons or an aryl group of 6 to 12 carbons; when p is 2, q is 2 and r is 1, $R^{19}$ is an unsubstituted or substituted alkyl group of 4 to 24 carbons and $R^{20}$ is an unsubstituted or substituted alkylene group of 2 to 15 carbons or an arylene group of 6 to 12 carbons; when p is 1, q is 2 and r is 2, $R^{19}$ is an unsubstituted or substituted di-tertiary alkylene group of 7 to 18 carbons and $R^{20}$ is a primary alkyl group of 1 to 18 carbons or an aryl group of 6 to 12 carbons. Substituents for $R^{19}$ and are chlorine, bromine, an alkyl group of 1 to 4 carbons, an alkoxy group of 1 to 4 carbons, an acyl group of 2 to 5 carbons, an aroyl group of 7 to 10 carbons and phenyl.

Useful peroxy esters include, for example, t-butyl perbenzoate, t-butyl peracetate, 2,5-dimethyl-2,5-di(-benzoylperoxy)hexane and di-t-butyl diperoxyazelate. However, other peroxy esters useful in the present invention will be evident to one skilled in the art based upon the present disclosure.

Exemplary solid peroxydicarbonates which may be used in the present invention, are represented by the following structure:

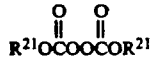

wherein $R^{21}$ is an alkyl group of 13 to 22 carbons, benzyl, 2-phenoxyethyl, cis-3,3,5-trimethylcyclohexyl, isobornyl, 4-t-butylcyclohecyl, cyclohexyl or any other group which will result in a compound having a m.p. >30° C.

Useful solid peroxydicarbonates according to the present invention include, for example, diisopropyl peroxydicarbonate and dicyclohexyl peroxydicarbonate. Other solid peroxydicarbonates useful in the present invention will be evident to one skilled in the art based upon the present disclosure.

A combination of two or more peroxides, such as blends of dialkyl and diperoxyketals in all proportions may also be used in the present composition. The use of a combination of appropriate peroxides, as well as the appropriate proportions of the combination, will be readily determinable by one skilled in the art.

Notwithstanding the above-noted peroxides, other organic peroxide initiators which will provide a crosslinked matrix when incorporated in polymeric and elastomeric resins may also be used as will be recognized by one skilled in the art.

The compositions of the instant invention can contain from about 10 parts to about 99 parts by weight of peroxide Preferably, the present compositions contain from about 60 to about 90 parts by weight of peroxide and more preferably, about 75 to about 80 parts by weight of peroxide.

In accordance with the present invention, the organic sulfide antioxidant compounds which prevent deterioration of the appearance and physical properties of the crosslinked polymers caused by oxidative degradation of the polymer bonds, are employed in combination with organic peroxides in crosslinked thermoplastic or polymeric resins. Similar organic sulfide compounds are described in U.S. Pat. Nos. 3,652,680 and 3,772,246, the disclosures of which are incorporated herein by reference. The organic sulfide compounds of the present compositions may be represented by any of Formulas I, II or III set forth below.

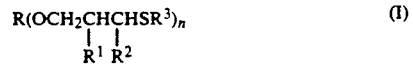

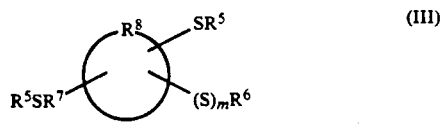

wherein:

m is 0 or 1;

n is an integer of 2 to 15;

R is a substituted or unsubstituted alkyl group of 2 to 30 carbons, a substituted or unsubstituted cycloalkyl group of 5 to 20 carbons, a substituted or unsubstituted alkyl group of 2 to 30 carbons where any of up to 6 carbon atoms are replaced with an O or S heteroatom, a substituted or unsubstituted cycloalkyl group of 5 to 20 carbons where any of up to 6 carbon atoms are replaced with an O or S heteroatom, with the proviso that the heteroatoms must be separated from each other and from the portion of the compound to which the R group is bonded by at least one carbon atom, the substituents for R being —OH, —$SR^4$ or —$OR^4$, wherein $R^4$ is an alkyl group of 1 to 30 carbons or a cycloalkyl group of 5 to 20 carbons;

$R^1$ and $R^2$ are independently H or an alkyl group of 1 to 4 carbons;

$R^3$ is an alkyl group of 1 to 24 carbons or a cycloalkyl group of 5 to 20 carbons;

$R^5$ is an alkyl group of 1 to 24 carbons;

$R^6$ is H or an alkyl group of 1 to 24 carbons, with the provisos that when m=0, $R^6$ is H or an alkyl group of 1 to 7 carbons and when m=1, $R^6$ is an alkyl group of 1 to 24 carbons;

$R^7$ is a direct bond or an alkylene group of 1 to 4 carbons; and $R^8$ is a monocyclic, bicyclic or tricyclic cycloalkyl group of 5 to 16 carbons.

Preferably, the organic sulfides of the present invention are those represented by Formulas I and II, wherein R is selected from the group consisting of:

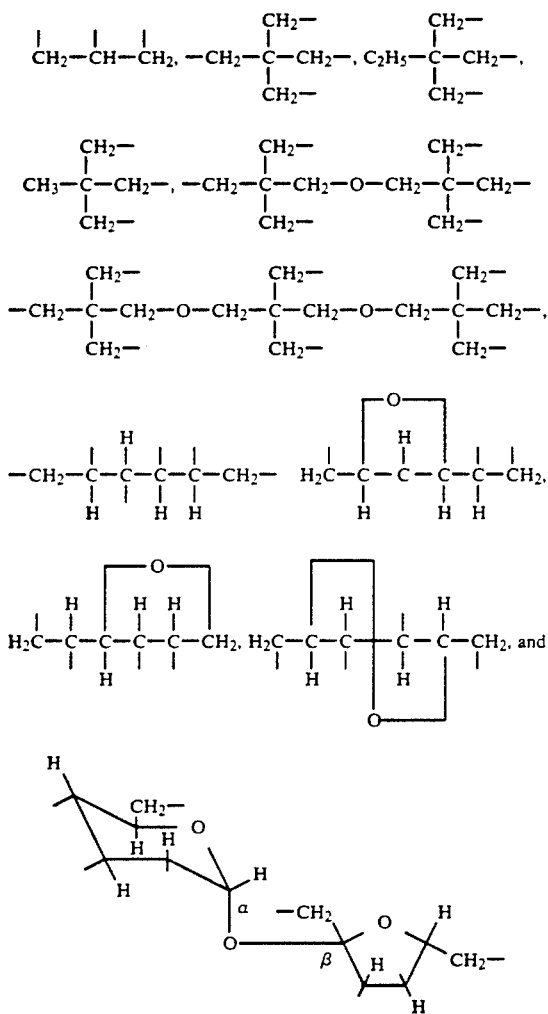

where
α and β are the types of linkages; wherein
$R^1$ is H or —CH$_3$;
$R^2$ is H; and
$R^3$ is an alkyl group of 10 to 18 carbons.

More preferably, the organic sulfide antioxidants useful in the present composition are represented by Formula I or II, wherein R is represented by

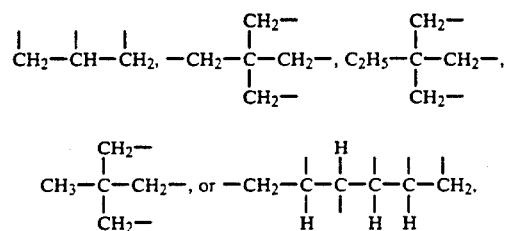

wherein
$R^1$ and $R^2$ are H; and
$R^3$ is an alkyl group of 12 to 18 carbons.

In the above-identified preferred and more preferred compounds, n is determined by the number of unattached bonds present in each R group.

The preferred organic sulfide antioxidants represented by Formula III are represented by one of the following structures

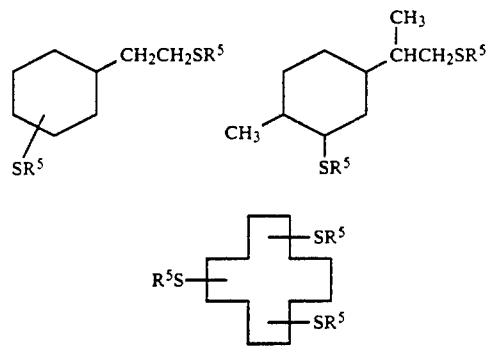

Non-limiting examples of representative organic sulfide antioxidants which are useful in the present composition are set forth below:

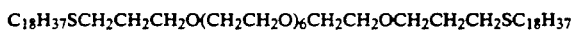

C$_{18}$H$_{37}$SCH$_2$CH$_2$CH$_2$O(CH$_2$CH$_2$O)$_6$CH$_2$CH$_2$OCH$_2$CH$_2$CH$_2$SC$_{18}$H$_{37}$

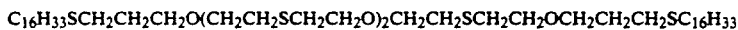

C$_{16}$H$_{33}$SCH$_2$CH$_2$CH$_2$O(CH$_2$CH$_2$SCH$_2$CH$_2$O)$_2$CH$_2$CH$_2$SCH$_2$CH$_2$OCH$_2$CH$_2$CH$_2$SC$_{16}$H$_{33}$

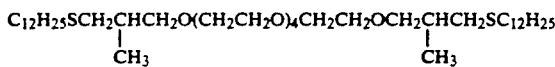

C$_{12}$H$_{25}$SCH$_2$CHCH$_2$O(CH$_2$CH$_2$O)$_4$CH$_2$CH$_2$OCH$_2$CHCH$_2$SC$_{12}$H$_{25}$
            |                                          |
           CH$_3$                                      CH$_3$

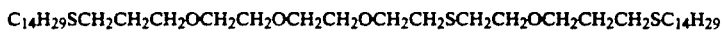

C$_{14}$H$_{29}$SCH$_2$CH$_2$CH$_2$OCH$_2$CH$_2$OCH$_2$CH$_2$OCH$_2$CH$_2$SCH$_2$CH$_2$OCH$_2$CH$_2$CH$_2$SC$_{14}$H$_{29}$

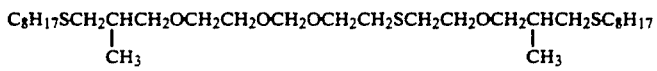

C$_8$H$_{17}$SCH$_2$CHCH$_2$OCH$_2$CH$_2$OCH$_2$OCH$_2$CH$_2$SCH$_2$CH$_2$OCH$_2$CHCH$_2$SC$_8$H$_{17}$
           |                                                              |
          CH$_3$                                                          CH$_3$

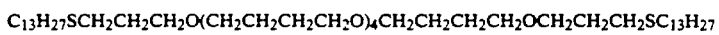

C$_{13}$H$_{27}$SCH$_2$CH$_2$CH$_2$O(CH$_2$CH$_2$CH$_2$CH$_2$O)$_4$CH$_2$CH$_2$CH$_2$CH$_2$OCH$_2$CH$_2$CH$_2$SC$_{13}$H$_{27}$ $H_2C-OCH_2CH_2CH_2SC_{18}H_{37}$
$HC-OCH_2CH_2CH_2SC_{18}H_{37}$
$H_2C-OCH_2CH_2CH_2SC_{18}H_{37}$ $H_2C-OCH_2CH_2CH_2SC_{12}H_{25}$
$HC-OCH_2CH_2CH_2SC_{12}H_{25}$
$H_2C-OCH_2CH_2CH_2SC_{12}H_{25}$ $H_2C-OCH_2CH_2CH_2SC_{16}H_{33}$
$HC-OCH_2CH_2CH_2SC_{16}H_{33}$
$H_2C-OCH_2CH_2CH_2SC_{16}H_{33}$ $H_2C-OCH_2CH_2CH_2SC_9H_{19}$
$HC-OCH_2CH_2CH_2SC_9H_{19}$
$H_2C-OCH_2CH_2CH_2SC_9H_{19}$

-continued $H_2C-OCH_2CH_2CH_2SC_{14}H_{29}$
$HC-OCH_2CH_2CH_2SC_{14}H_{29}$
$H_2C-OCH_2CH_2CH_2SC_{14}H_{29}$ $H_2C-OCH_2CH_2CH_2SC_{13}H_{27}$
$HC-OCH_2CH_2CH_2SC_{13}H_{27}$
$H_2C-OCH_2CH_2CH_2SC_{13}H_{27}$ $H_2C-OCH_2CH_2CH_2SC_{17}H_{35}$
$HC-OCH_2CH_2CH_2SC_{17}H_{35}$
$H_2C-OCH_2CH_2CH_2SC_{17}H_{35}$ $H_2C-O-CH_2CHCH_2SC_{10}H_{21}$
       $|$
       $CH_3$
$HC-O-CH_2CHCH_2SC_{10}H_{21}$
       $|$
       $CH_3$
$H_2C-O-CH_2CHCH_2SC_{10}H_{21}$
       $|$
       $CH_3$ $H_2C-OCH_2CH_2CH_2SC_8H_{17}$
$HC-OCH_2CH_2CH_2SC_8H_{17}$
$H_2C-OCH_2CH_2CH_2SC_8H_{17}$ $H_2C-OCH_2CHCH_2SC_8H_{17}$
       $|$
       $CH_3$
$HC-OCH_2CHCH_2SC_8H_{17}$
       $|$
       $CH_3$
$H_2C-OCH_2CHCH_2SC_8H_{17}$
       $|$
       $CH_3$ $H_2C-OCH_2CHCH_2SC_{12}H_{25}$
       $|$
       $CH_3$
$HC-OCH_2CHCH_2SC_{12}H_{25}$
       $|$
       $CH_3$
$H_2C-OCH_2CHCH_2SC_{12}H_{25}$
       $|$
       $CH_3$ $H_2C-OCH_2CHCH_2SC_{16}H_{33}$
       $|$
       $CH_3$
$HC-OCH_2CHCH_2SC_{16}H_{33}$
       $|$
       $CH_3$
$H_2C-OCH_2CHCH_2SC_{16}H_{33}$
       $|$
       $CH_3$ $H_2C-OCH_2CHCH_2SC_{18}H_{37}$
       $|$
       $CH_3$
$HC-OCH_2CHCH_2SC_{18}H_{37}$
       $|$
       $CH_3$
$H_2C-OCH_2CHCH_2SC_{18}H_{37}$
       $|$
       $CH_3$ $H_2C-OCH_2CH_2CH_2SC_4H_9$
$HC-OCH_2CH_2CH_2SC_4H_9$
$H_2C-OCH_2CH_2CH_2SC_4H_9$ $H_2C-OCH_2CHCH_2SC_{13}H_{27}$
       $|$
       $CH_3$
$HC-OCH_2CHCH_2SC_{13}H_{27}$
       $|$
       $CH_3$
$H_2C-OCH_2CHCH_2SC_{13}H_{27}$
       $|$
       $CH_3$ $H_2C-OCH_2CH_2CHSC_{12}H_{25}$
              $|$
              $CH_3$
$HC-OCH_2CH_2CHSC_{12}H_{25}$
              $|$
              $CH_3$
$H_2C-OCH_2CH_2CHSC_{12}H_{25}$
              $|$
              $CH_3$ $H_2C-OCH_2CHCH_2SC_{16}H_{33}$
       $|$
       $C_3H_7$
$HC-OCH_2CHCH_2SC_{16}H_{33}$
       $|$
       $C_3H_7$
$H_2C-OCH_2CHCH_2SC_{16}H_{33}$
       $|$
       $C_3H_7$ $H_2C-OCH_2CH_2CH_2SC_{12}H_{25}$
$HC-OCH_2CHCH_2SC_{12}H_{25}$
       $|$
       $CH_3$
$H_2C-OCH_2CH_2CH_2SC_{12}H_{25}$

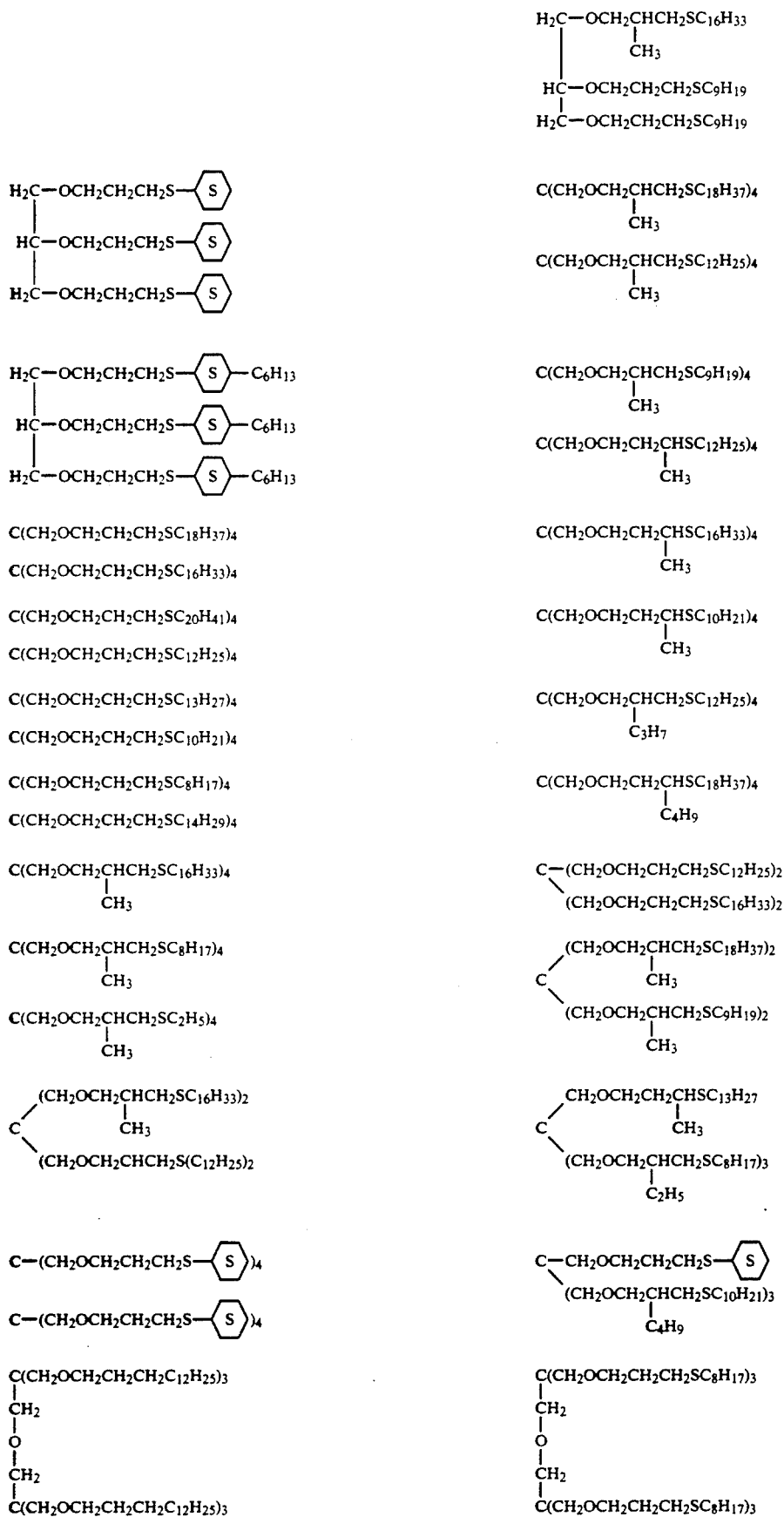

-continued

```
C(CH2OCH2CH2CH2C16H33)3
|
CH2
|
O
|
CH2
|
C(CH2OCH2CH2CH2C16H33)3
```

```
C(CH2OCH2CH2CH2SC9H19)3
|
CH2
|
O
|
CH2
|
C(CH2OCH2CH2CH2SC9H19)3
```

```
C(CH2OCH2CH2CH2SC18H37)3
|
CH2
|
O
|
CH2
|
C(CH2OCH2CH2CH2SC18H37)3
```

```
C(CH2OCH2CH2CH2S—⟨S⟩—C4H9)3
|
CH2
|
O
|
CH2
|
C(CH2OCH2CH2CH2S—⟨S⟩—C4H9)3
```

```
C(CH2OCH2CH2CHSCH3)3
|           |
CH2        CH3
|
O
|
CH2
|
C(CH2OCH2CH2CHSCH3)3
            |
            CH3
```

```
C(CH2OCH2CH2CHSC6H13)3
|           |
CH2        CH3
|
O
|
CH2
|
C(CH2OCH2CH2CHSC6H13)3
            |
            CH3
```

```
C(CH2OCH2CH2CH2SC10H21)3
|
CH2
|
O
|
CH2
|
C(CH2OCH2CH2CH2SC10H21)3
```

```
C(CH2OCH2CHCH2SC12H25)3
|         |
CH2      CH3
|
O
|
CH2
|
C(CH2OCH2CHCH2SC12H25)3
          |
          CH3
```

```
C(CH2OCH2CH2CH2SC20H41)3
|
CH2
|
O
|
CH2
|
C(CH2OCH2CH2CH2SC20H41)3
```

```
C(CH2OCH2CHCH2SC9H19)3
|         |
CH2      CH3
|
O
|
CH2
|
C(CH2OCH2CHCH2SC9H19)3
          |
          CH3
```

```
C(CH2OCH2CH2CH2SC13H27)3
|
CH2
|
O
|
CH2
|
C(CH2OCH2CH2CH2SC13H27)3
```

```
C(CH2OCH2CHCH2SC16H33)3
|         |
CH2      CH3
|
O
|
CH2
|
C(CH2OCH2CHCH2SC16H33)3
          |
          CH3
```

```
C(CH2OCH2CH2CH2SC11H23)3
|
CH2
|
O
|
CH2
|
C(CH2OCH2CH2CH2SC11H23)3
```

```
C(CH2OCH2CHCH2SC18H37)3
|         |
CH2      CH3
|
O
|
CH2
|
C(CH2OCH2CHCH2SC18H37)3
          |
          CH3
```

-continued

C(CH₂OCH₂CHCH₂SC₁₅H₃₁)₃
|       |
CH₂    CH₃
|
O
|
CH₂
|
C(CH₂OCH₂CHCH₂SC₁₅H₃₁)₃
              |
              CH₃

C—(CH₂OCH₂CH₂CH₂SC₁₆H₃₃)₂
|\
CH₂  CH₂OCH₂CH₂CH₂SC₁₂H₂₅
|
O
|
CH₂
|
C(CH₂OCH₂CH₂CH₂SC₁₂H₂₅)₃

C(CH₂OCH₂CH₂CHSC₁₂H₂₅)₃
|              |
CH₂           CH₃
|
O
|
CH₂
|
C(CH₂OCH₂CH₂CHSC₁₂H₂₅)₃
              |
              CH₃

C—CH₂OCH₂CH₂SC₁₃H₂₇
|\
CH₂  (CH₂OCH₂CH₂CH₂SC₁₈H₃₇)₂
|
O
|
CH₂
|
C—CH₂OCH₂CH₂CH₂SC₁₃H₂₇
 \
  (CH₂OCH₂CH₂CH₂SC₁₈H₃₇)₂

C(CH₂OCH₂CH₂CHSC₂₀H₄₁)₃
|              |
CH₂           CH₃
|
O
|
CH₂
|
C(CH₂OCH₂CHCH₂SC₁₇H₃₅)₃
              |
              CH₃

C(CH₂OCH₂CH₂CH₂S—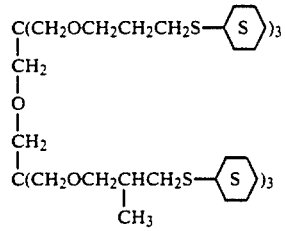)₃
|
CH₂
|
O
|
CH₂
|
C(CH₂OCH₂CHCH₂S—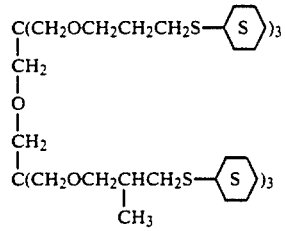)₃
              |
              CH₃

C(CH₂OCH₂CH₂CHSC₈H₁₇)₃
|              |
CH₂           CH₃
|
O
|
CH₂
|
C(CH₂OCH₂CHCH₂SC₁₀H₂₁)₃
              |
              C₃H₇

C(CH₂OCH₂CH₂CH₂SC₁₂H₂₅)₃
|
CH₂
|
O
|
CH₂
|
C(CH₂OCH₂CH₂CH₂SC₁₂H₂₅)₂
|
CH₂
|
O
|
CH₂
|
C(CH₂OCH₂CH₂CH₂SC₁₂H₂₅)₃

CH₃
          |
C(CH₂OCH₂CHCH₂SC₁₂H₂₅)₃
|
CH₂
|
O
|
CH₂
|
C(CH₂OCH₂CH₂CH₂SC₁₆H₃₃)₃

C(CH₂OCH₂CHCH₂SC₈H₁₇)₃
|              |
CH₂           CH₃
|
O
|
CH₂
|
C(CH₂OCH₂CHCH₂SC₈H₁₇)₂
|              |
CH₂           CH₃
|
O
|
CH₂
|
C(CH₂OCH₂CHCH₂SC₈H₁₇)₃
              |
              CH₃

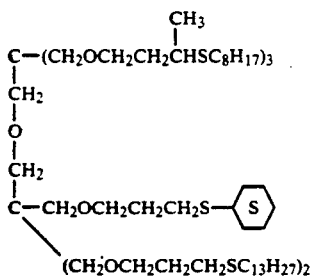

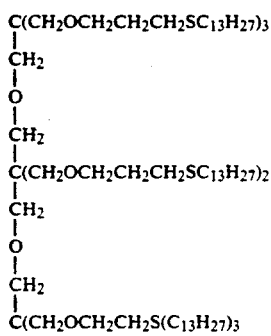

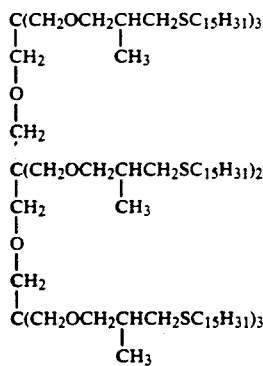

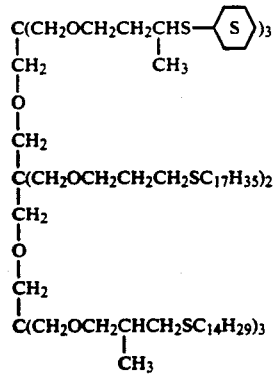

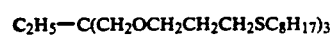

C₂H₅—C(CH₂OCH₂CH₂CH₂SC₈H₁₇)₃

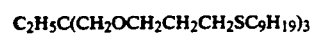

C₂H₅C(CH₂OCH₂CH₂CH₂SC₉H₁₉)₃

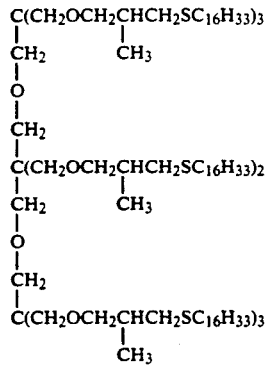

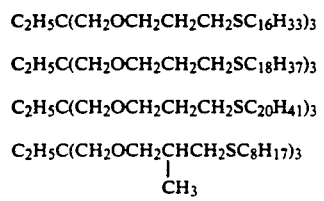

C₂H₅C(CH₂OCH₂CH₂CH₂SC₁₆H₃₃)₃

C₂H₅C(CH₂OCH₂CH₂CH₂SC₁₈H₃₇)₃

C₂H₅C(CH₂OCH₂CH₂CH₂SC₂₀H₄₁)₃

C₂H₅C(CH₂OCH₂CHCH₂SC₈H₁₇)₃
　　　　　　　　　　|
　　　　　　　　　　CH₃

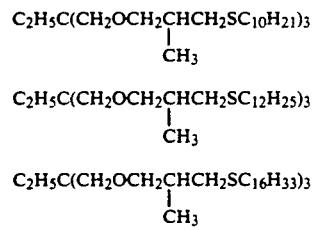

C₂H₅C(CH₂OCH₂CHCH₂SC₁₀H₂₁)₃
　　　　　　　　　　|
　　　　　　　　　　CH₃

C₂H₅C(CH₂OCH₂CHCH₂SC₁₂H₂₅)₃
　　　　　　　　　　|
　　　　　　　　　　CH₃

C₂H₅C(CH₂OCH₂CHCH₂SC₁₆H₃₃)₃
　　　　　　　　　　|
　　　　　　　　　　CH₃

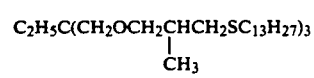

C₂H₅C(CH₂OCH₂CHCH₂SC₁₃H₂₇)₃
　　　　　　　　　　|
　　　　　　　　　　CH₃

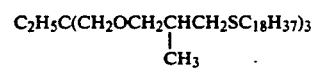

C₂H₅C(CH₂OCH₂CHCH₂SC₁₈H₃₇)₃
　　　　　　　　　　|
　　　　　　　　　　CH₃

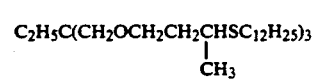

C₂H₅C(CH₂OCH₂CH₂CHSC₁₂H₂₅)₃
　　　　　　　　　　|
　　　　　　　　　　CH₃

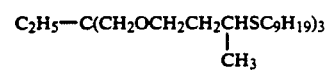

C₂H₅—C(CH₂OCH₂CH₂CHSC₉H₁₉)₃
　　　　　　　　　　|
　　　　　　　　　　CH₃

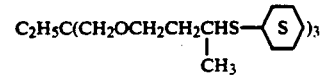

$C_2H_5C(CH_2OCH_2CH_2CH_2SC_{10}H_{21})_3$ $C_2H_5C(CH_2OCH_2CH_2CH_2SC_{13}H_{27})_3$ $C_2H_5C(CH_2OCH_2CH_2CH_2SC_{14}H_{29})_3$ $CH_3C(CH_2OCH_2CH_2CH_2SC_{10}H_{21})_3$ $CH_3C(CH_2OCH_2CH_2CH_2SC_8H_{17})_3$ $CH_3C(CH_2OCH_2CH_2CH_2SC_9H_{19})_3$ $CH_3C(CH_2OCH_2CH_2CH_2SC_{11}H_{23})_3$ $CH_3C(CH_2OCH_2CH_2CH_2SC_{12}H_{25})_3$ $CH_3C(CH_2OCH_2CH_2CH_2SC_{13}H_{27})_3$ $CH_3C(CH_2OCH_2CH_2CH_2SC_{14}H_{29})_3$ $CH_3C(CH_2OCH_2CH_2CH_2SC_{16}H_{33})_3$ $CH_3C(CH_2OCH_2CH_2CH_2SC_{18}H_{37})_3$ $CH_3C(CH_2OCH_2CH_2CH_2SC_{19}H_{39})_3$ $CH_3C(CH_2OCH_2CHCH_2SC_8H_{17})_3$
  $\quad\quad\quad\quad\quad\quad\quad\quad |$
  $\quad\quad\quad\quad\quad\quad\quad\quad CH_3$ $O(CH_2CH_2CH_2SC_8H_{17})_2$ $O(CH_2CHCH_2SC_{10}H_{21})_2$
  $\quad\quad\quad |$
  $\quad\quad\quad CH_3$ $O(CH_2CH_2CH_2SC_{12}H_{25})_2$ $O(CH_2CHCH_2SC_{13}H_{27})_2$
  $\quad\quad\quad |$
  $\quad\quad\quad C_2H_5$ $CH_3C(CH_2OCH_2CHCH_2SC_{10}H_{21})_3$
  $\quad\quad\quad\quad\quad\quad\quad\quad\quad |$
  $\quad\quad\quad\quad\quad\quad\quad\quad\quad CH_3$ $CH_3C(CH_2OCH_2CHCH_2SC_{12}H_{25})_3$
  $\quad\quad\quad\quad\quad\quad\quad\quad\quad |$
  $\quad\quad\quad\quad\quad\quad\quad\quad\quad CH_3$ $CH_3C(CH_2OCH_2CHCH_2SC_{16}H_{33})_3$
  $\quad\quad\quad\quad\quad\quad\quad\quad\quad |$
  $\quad\quad\quad\quad\quad\quad\quad\quad\quad CH_3$ $CH_3C(CH_2OCH_2CHCH_2SC_{18}H_{37})_3$
  $\quad\quad\quad\quad\quad\quad\quad\quad\quad |$
  $\quad\quad\quad\quad\quad\quad\quad\quad\quad CH_3$ $CH_3C(CH_2OCH_2CH_2CHSC_{12}H_{25})_3$
  $\quad\quad\quad\quad\quad\quad\quad\quad\quad |$
  $\quad\quad\quad\quad\quad\quad\quad\quad\quad CH_3$ $CH_3C(CH_2OCH_2CH_2CHS-\langle S \rangle-C_6H_{13})_3$
  $\quad\quad\quad\quad\quad\quad\quad\quad |$
  $\quad\quad\quad\quad\quad\quad\quad\quad CH_3$ -continued $C_2H_5C-(CH_2OCH_2CH_2CH_2SC_{12}H_{25})_2$
  $\quad\quad\backslash$
  $\quad\quad\quad CH_2OCH_2CH_2CH_2SC_{16}H_{33}$ $\quad\quad\quad\quad\quad\quad (CH_2OCH_2CHCH_2SC_8H_{17})_2$
$\quad\quad\quad\quad /\quad\quad\quad\quad\quad\quad\quad\quad |$
$C_2H_5C\quad\quad\quad\quad\quad\quad\quad\quad\quad\quad C_4H_9$
$\quad\quad\quad\quad \backslash$
$\quad\quad\quad\quad\quad CH_2OCH_2CHCH_2SC_{10}H_{21}$
$\quad\quad\quad\quad\quad\quad\quad\quad\quad\quad\quad |$
$\quad\quad\quad\quad\quad\quad\quad\quad\quad\quad\quad C_4H_9$ $CH_3C-(CH_2OCH_2CH_2CH_2SC_{12}H_{25})_2$
  $\quad\quad\backslash$
  $\quad\quad\quad CHOCH_2CHCH_2SC_{12}H_{25}$
  $\quad\quad\quad\quad\quad\quad\quad\quad |$
  $\quad\quad\quad\quad\quad\quad\quad\quad CH_3$ $\quad\quad\quad\quad\quad CH_2OCH_2CH_2CH_2SC_{10}H_{21}$
$\quad\quad\quad\quad /$
$CH_3C-CH_2OCH_2CH_2CH_2SC_{12}H_{25}$
$\quad\quad\quad\quad \backslash$
$\quad\quad\quad\quad\quad CH_2OCH_2CH_2CH_2SC_{16}H_{33}$ $CH_3C(CH_2OCH_2CHCH_2SC_{12}H_{25})_3$
  $\quad\quad\quad\quad\quad\quad\quad\quad |$
  $\quad\quad\quad\quad\quad\quad\quad\quad C_3H_7$ $\quad\quad\quad\quad\quad\quad\quad\quad CH_2OCH_2CH_2CH_2SC_{12}H_{25}$
$\quad\quad\quad\quad\quad\quad\quad\quad |$
$\quad\quad\quad\quad\quad\quad\quad\quad HCO-CH_2CH_2CH_2SC_{12}H_{25}$
$\quad\quad\quad\quad\quad\quad\quad\quad |$
$C_{12}H_{25}SCH_2CH_2CH_2O-CH$
$\quad\quad\quad\quad\quad\quad\quad\quad |$
$\quad\quad\quad\quad\quad\quad\quad\quad HCO-CH_2CH_2CH_2SC_{12}H_{25}$
$\quad\quad\quad\quad\quad\quad\quad\quad |$
$\quad\quad\quad\quad\quad\quad\quad\quad HCO-CH_2CH_2CH_2SC_{12}H_{25}$
$\quad\quad\quad\quad\quad\quad\quad\quad |$
$\quad\quad\quad\quad\quad\quad\quad\quad CH_2OCH_2CH_2CH_2SC_{12}H_{25}$ $O(CH_2CH_2CH_2SC_{16}H_{33})_2$ $O(CH_2CH_2CHSC_9H_{19})_2$
  $\quad\quad\quad |$
  $\quad\quad\quad CH_3$ $O(CH_2CH_2CH_2SC_{18}H_{37})_2$ $\quad\quad\quad\quad\quad\quad\quad\quad CH_2OCH_2CH_2CH_2SC_{16}H_{33}$
$\quad\quad\quad\quad\quad\quad\quad\quad |$
$\quad\quad\quad\quad\quad\quad\quad\quad HCO-CH_2CH_2CH_2SC_{16}H_{33}$
$\quad\quad\quad\quad\quad\quad\quad\quad |$
$C_{16}H_{33}SCH_2CH_2CH_2O-CH$
$\quad\quad\quad\quad\quad\quad\quad\quad |$
$\quad\quad\quad\quad\quad\quad\quad\quad HCO-CH_2CH_2CH_2SC_{16}H_{33}$
$\quad\quad\quad\quad\quad\quad\quad\quad |$
$\quad\quad\quad\quad\quad\quad\quad\quad HCO-CH_2CH_2CH_2SC_{16}H_{33}$
$\quad\quad\quad\quad\quad\quad\quad\quad |$
$\quad\quad\quad\quad\quad\quad\quad\quad CH_2OCH_2CH_2CH_2SC_{16}H_{33}$ $\quad\quad\quad\quad\quad\quad\quad\quad CH_2OCH_2CH_2CH_2SC_{18}H_{37}$
$\quad\quad\quad\quad\quad\quad\quad\quad |$
$\quad\quad\quad\quad\quad\quad\quad\quad HCO-CH_2CH_2CH_2SC_{18}H_{37}$
$\quad\quad\quad\quad\quad\quad\quad\quad |$
$C_{18}H_{37}SCH_2CH_2CH_2O-CH$
$\quad\quad\quad\quad\quad\quad\quad\quad |$
$\quad\quad\quad\quad\quad\quad\quad\quad HCO-CH_2CH_2CH_2SC_{18}H_{37}$
$\quad\quad\quad\quad\quad\quad\quad\quad |$
$\quad\quad\quad\quad\quad\quad\quad\quad HCO-CH_2CH_2CH_2SC_{18}H_{37}$
$\quad\quad\quad\quad\quad\quad\quad\quad |$
$\quad\quad\quad\quad\quad\quad\quad\quad CH_2OCH_2CH_2CH_2SC_{18}H_{37}$

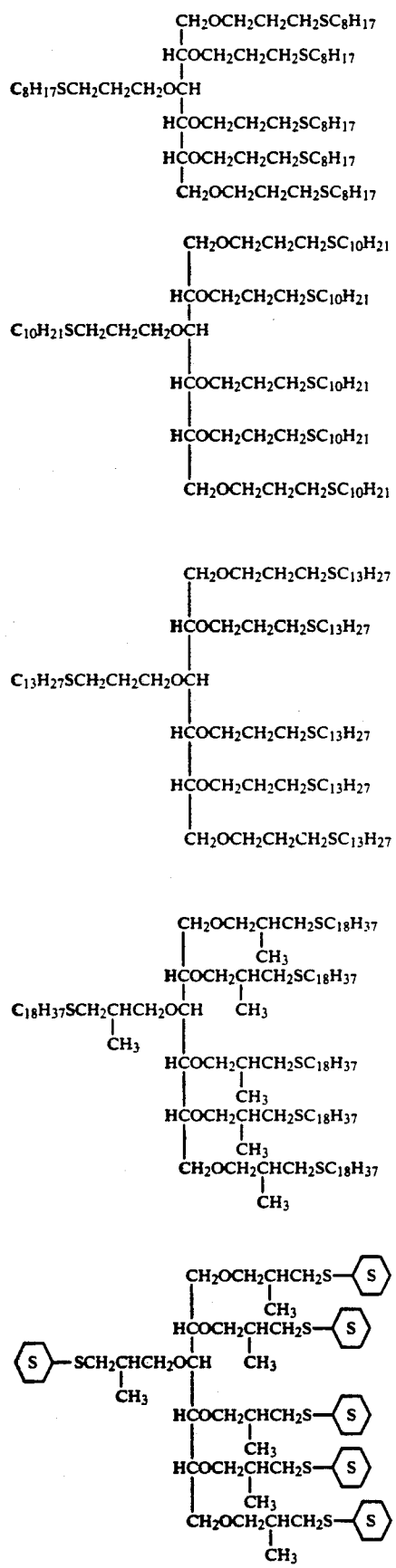
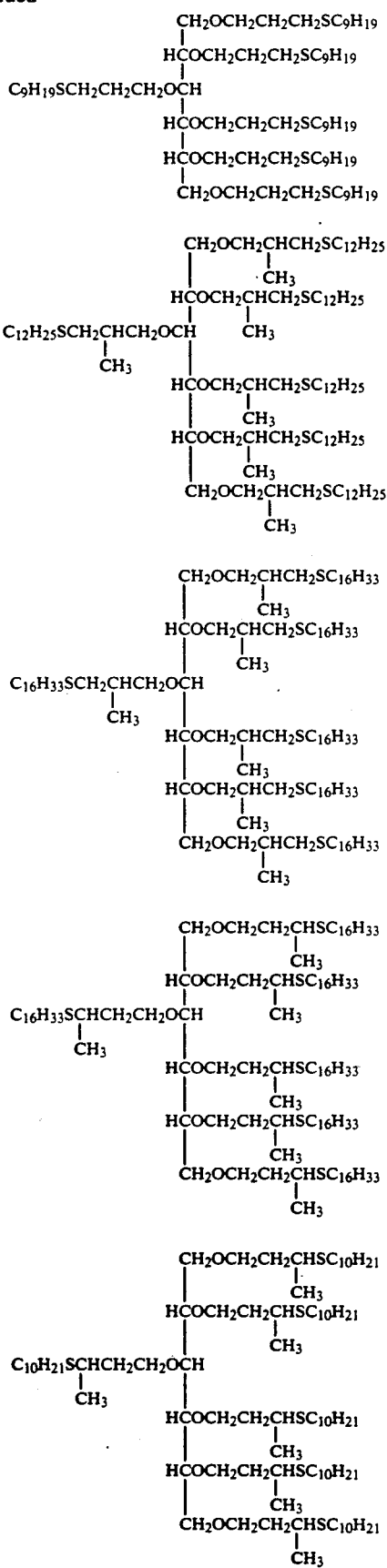

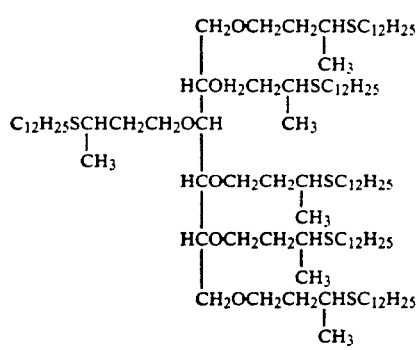
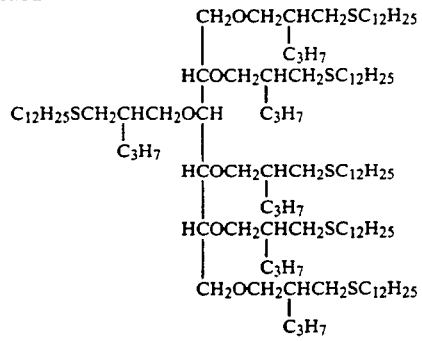

In the following non-limiting examples of representative structures for the organic sulfide antioxidants of the present invention, the sorbitan backbone shown is a 1,4-sorbitan, which comprises approximately 85% of the sorbitan conventionally used. Sorbitan also contains approximately 13% of 3,6-sorbitan and about 2% of 2,5-anhydro-L-iditol (both isomers of 1,4-sorbitan). Accordingly it will be understood by one skilled in the art that the organic sulfide antioxidants set forth below, which are derived from 1,4-sorbitan, also include those derived from 3,6-sorbitan and 2,5-anhydro-L-iditol.

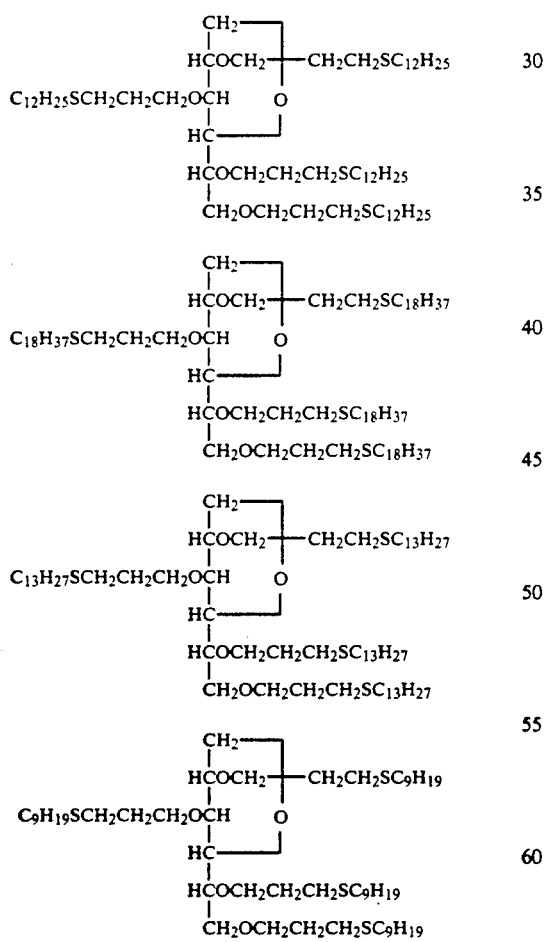

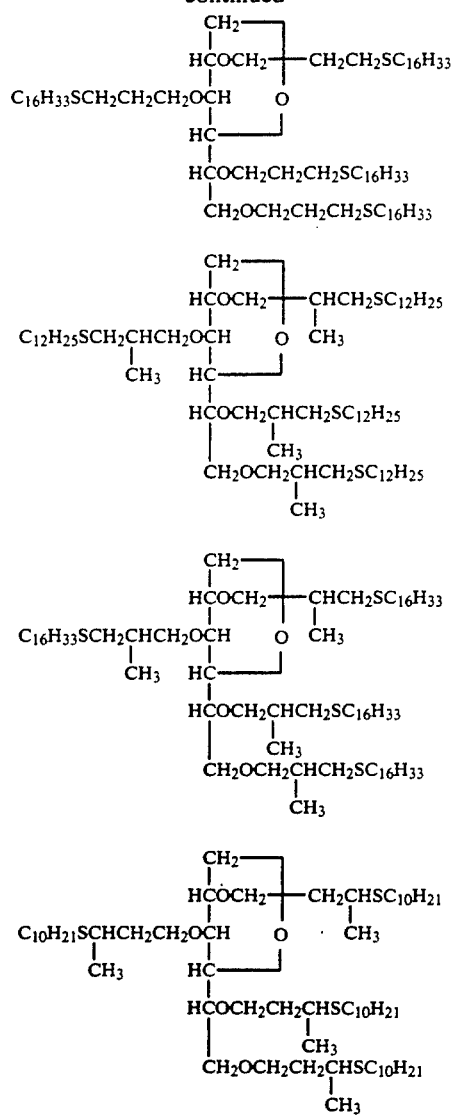

-continued
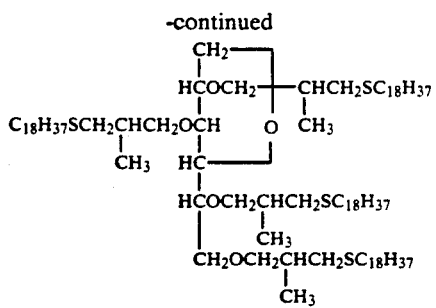
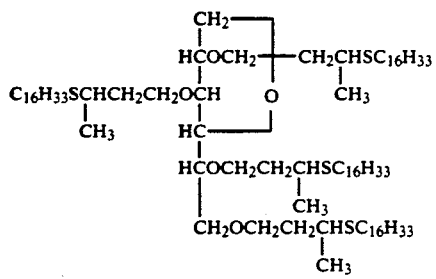
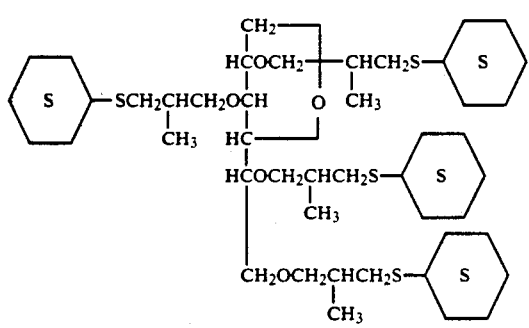
-continued
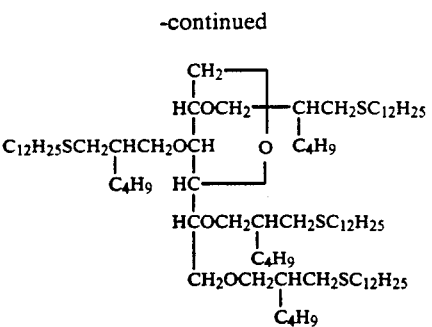
In the following non-limiting examples of representative organic sulfide antioxidants useful in the present invention which are derived from sucrose,
Z is $CH_2CH_2CH_2SR^3$;
$Z^1$ is
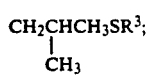
$Z^2$ is
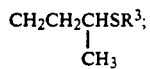
and
$R^3$ is defined above.
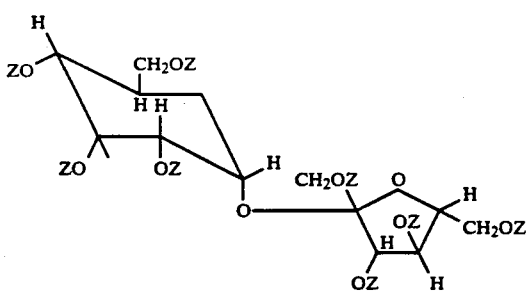
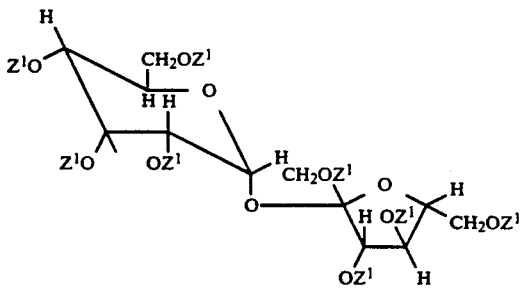

-continued
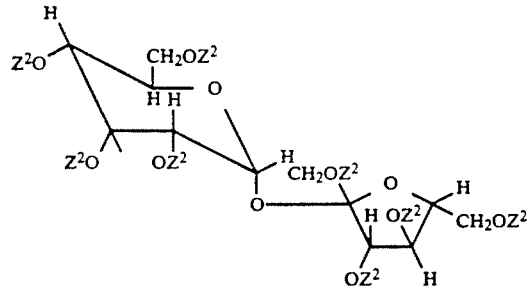
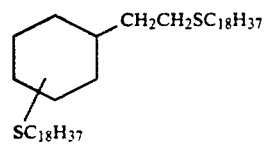
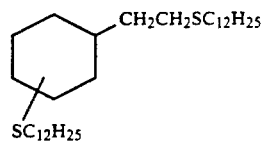
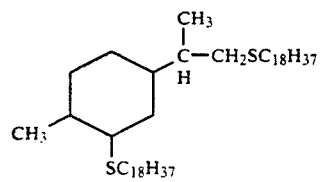
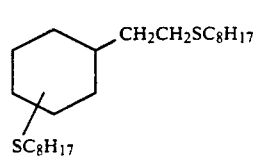
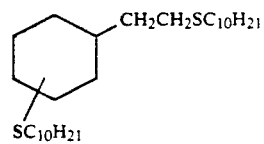
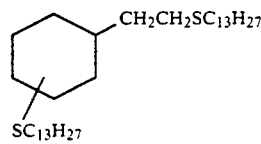
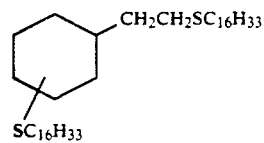
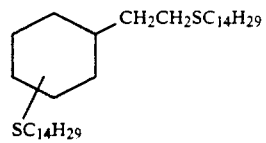
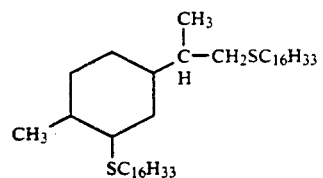
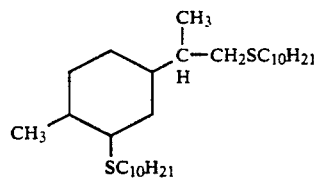
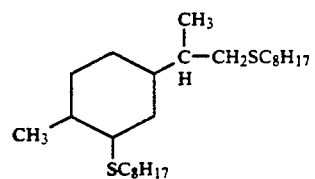
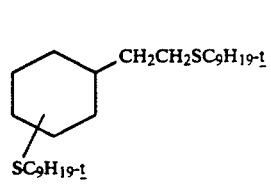
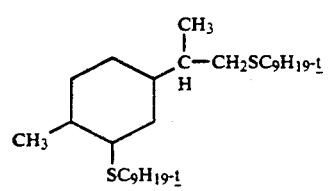
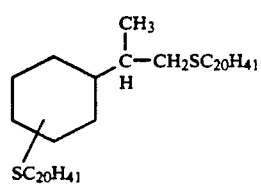

-continued
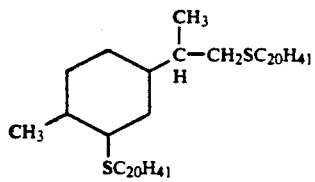 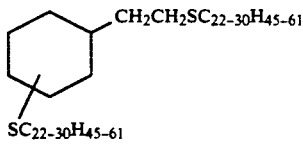
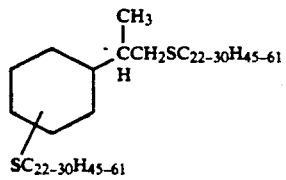 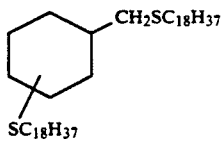
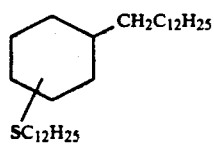 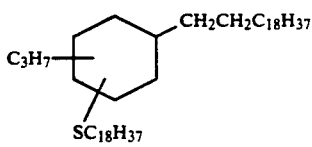
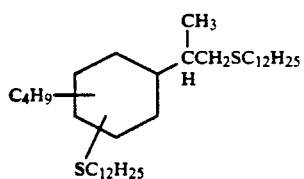 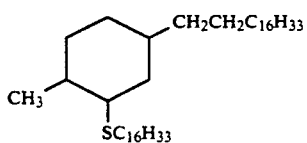
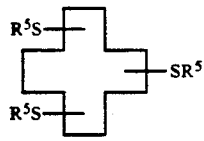
$R^5$ = $C_8$ to $C_{18}$ alkyl
 
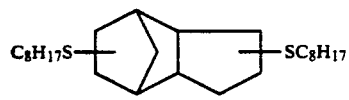 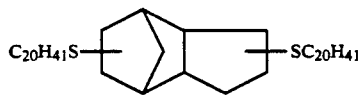
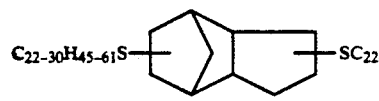 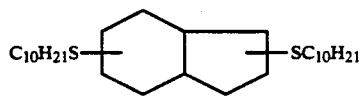
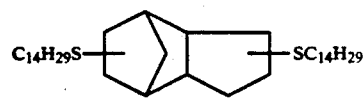 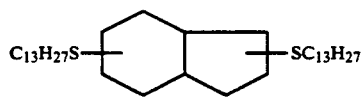
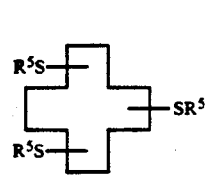 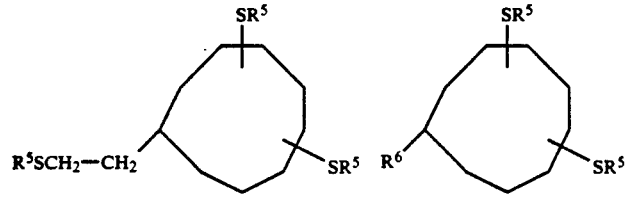

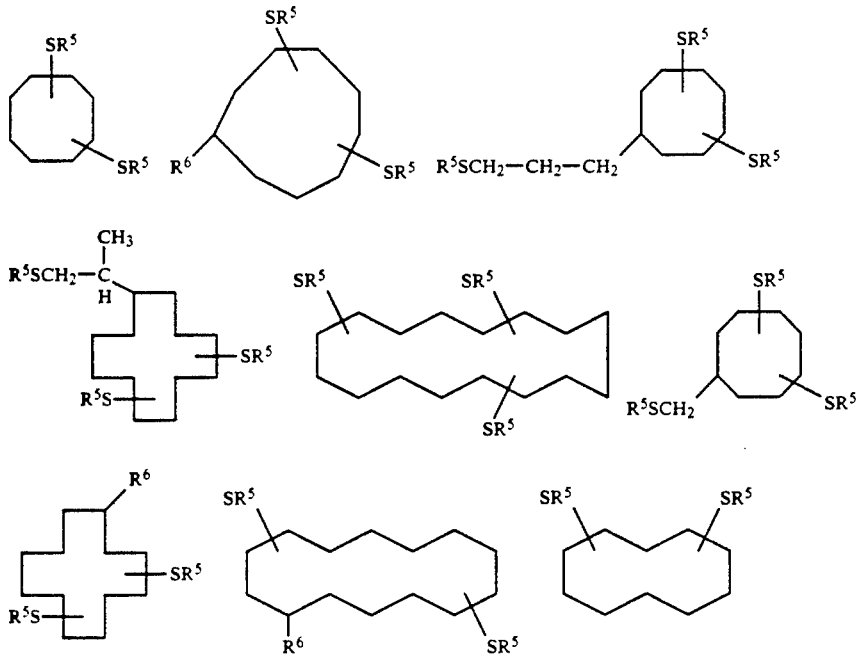
$R^5$ in the above formulas represents an alkyl group of 8 to 24 carbon atoms and $R^6$ represents an alkyl group of 1 to 7 carbon atoms.
Non-limiting examples of preferred organic sulfide antioxidants useful in the present invention include, e.g.,
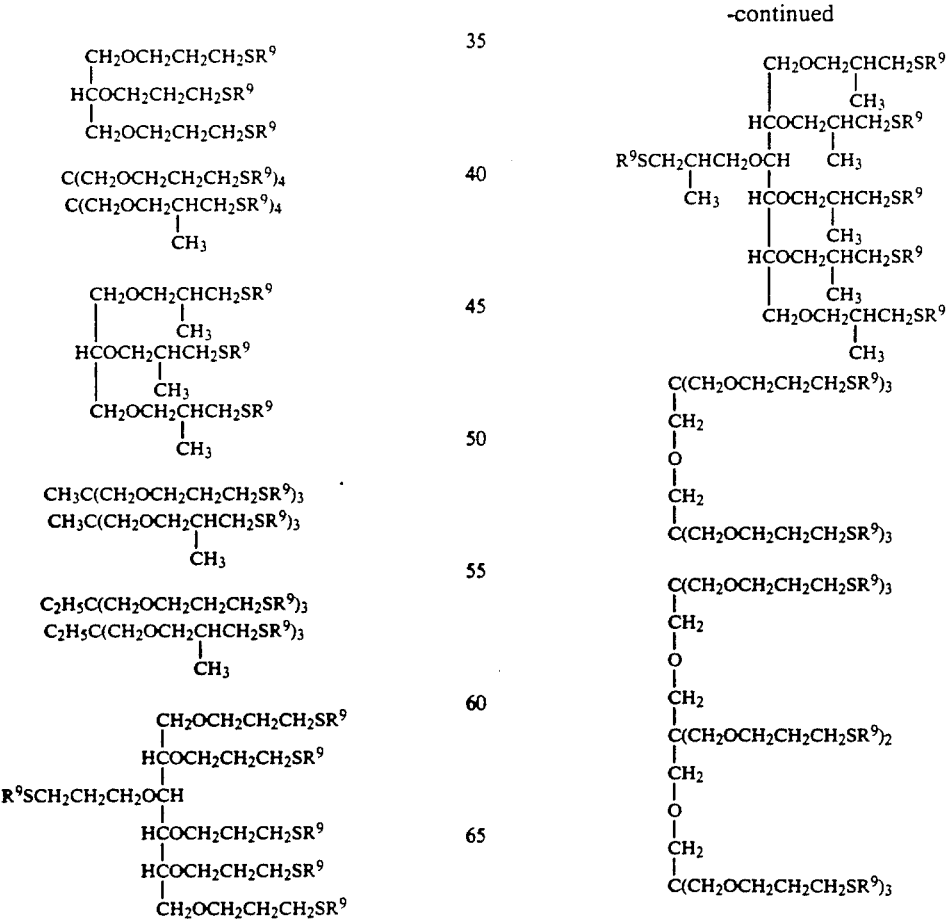

-continued
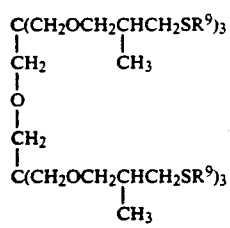
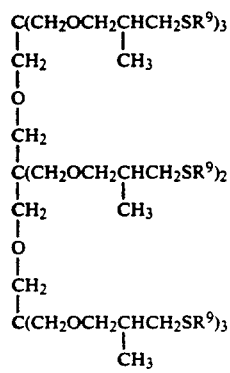
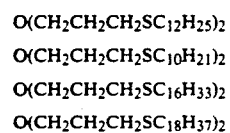
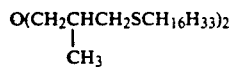
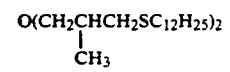
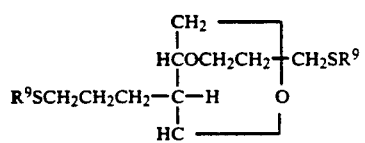
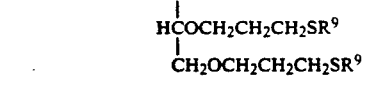
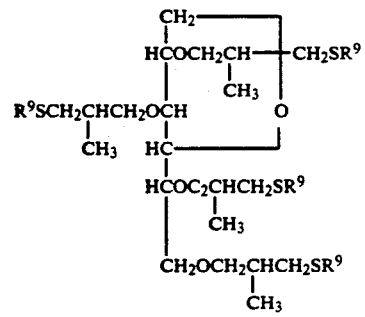
(plus other isomers of sorbitan)
-continued
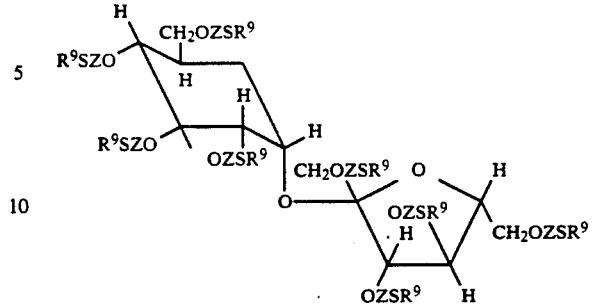
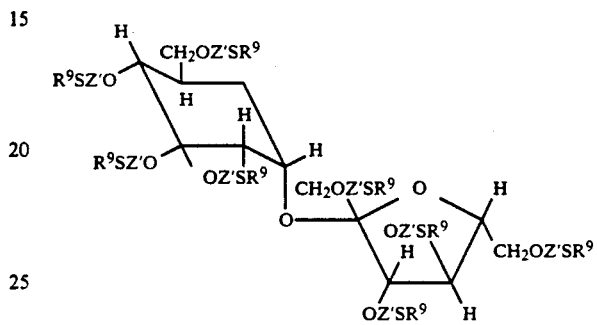
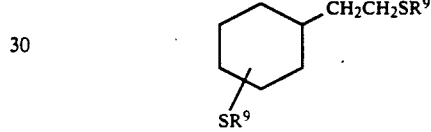
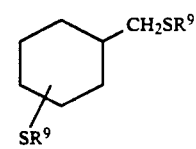
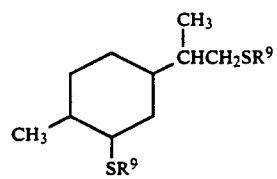
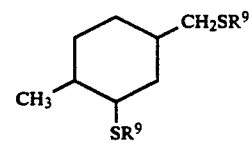
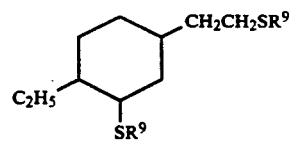
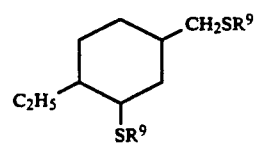

-continued

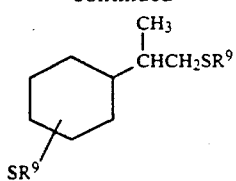

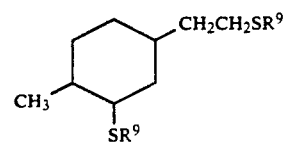

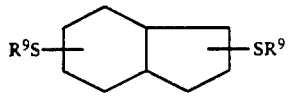

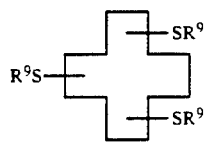

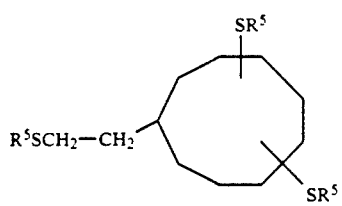

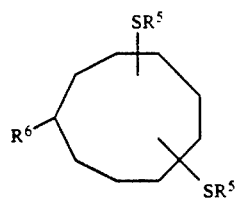

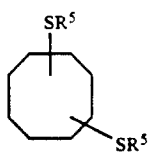

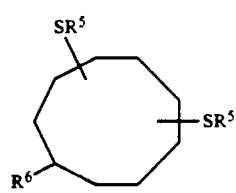

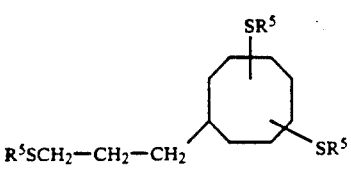

-continued

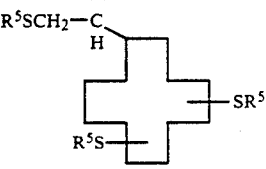

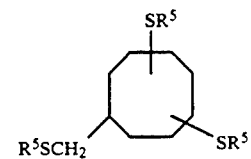

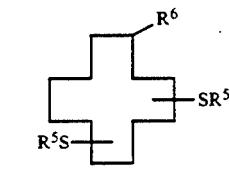

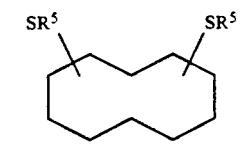

wherein $R^9$ represents an alkyl group of 10–18 carbons; $R^6$ is —H, —$CH_3$ or —$C_2H_5$ and Z and Z' are as defined above.

Non-limiting examples of the most preferred organic sulfide antioxidants useful in the compositions of the present invention include, e.g., $$\begin{array}{c} CH_2OCH_2CH_2CH_2SR^{10} \\ | \\ HCOCH_2CH_2CH_2SR^{10} \\ | \\ CH_2OCH_2CH_2CH_2SR^{10} \end{array}$$

$C(CH_2OCH_2CH_2CH_2SR^{10})_4$
$CH_3C(CH_2OCH_2CH_2CH_2SR^{10})_3$
$C_2H_5C(CH_2OCH_2CH_2CH_2SR^{10})_3$
$O(CH_2CH_2CH_2SR^{10})_2$

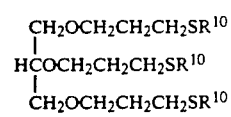

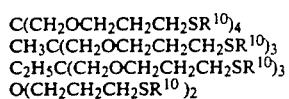

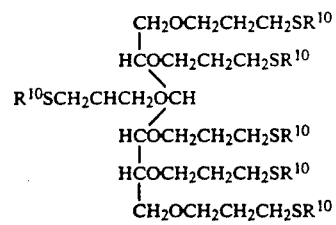

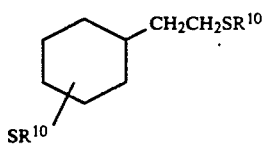

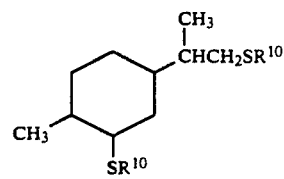

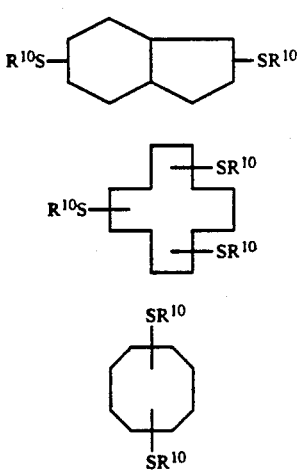

wherein R[10] represents an alkyl group of 12-18 carbons.

Compounds of Formula I may be prepared, e.g., by first reacting a polyol (with two or more hydroxyl groups per molecule) with an allylic or substituted allylic halide (chloride, bromide, or iodide) in the presence of a base, such as sodium or potassium hydroxide, for example. The amount of base used should be an amount sufficient to remove by-product hydrogen halide and to form the corresponding polyallylic ether Water or an inert solvent may be used if necessary to facilitate the separation of the by-product metal halide from the polyallylic ether.

Next, a mercaptan is added to the resultant polyallylic ether of the above reaction, under free radical conditions (i.e., in the presence of peroxides, azo compounds, ultra-violet light, etc.), in order to form the antioxidant compounds of this invention. The number of moles of mercaptan employed in this reaction is an amount at least equal to the number of double bonds in the polyallylic ether.

Compounds of Formula II and III may be prepared by adding a mercaptan to either a diallyl ether or an olefin, respectively, by the method described above for compounds represented by Formula I. Other appropriate methods for preparing compounds represented by Formula I, II or III of the present invention and will be apparent to one skilled in the art based upon the present disclosure.

Non-limiting examples of preferred organic sulfide antioxidants useful in the present compositions include 2,9-bis(octadecylthio)-p-menthane; beta(alkylthio)ethyl-3-(alkylthio)cyclohexane; beta(alkylthio)ethyl-4-(alkylthio)cyclohexane; beta(n-octadecylthio)ethyl-3-(n-octadecylthio)cyclohexane, beta(n-octadecylthio)ethyl-4-(n-octadecylthio)cyclohexane, which are all usually prepared as a mixture of isomers and referred to hereinafter as "beta(alkylthio)ethyl-3 and 4-(alkylthio)cyclohexane", and equivalent terms; 1,5,9-tris(hexadecylthio)cyclododecane, 1,5,8-tris(hexadecylthio)cyclododecane, 1,4,8-tris(hexadecylthio)cyclododecane, which are usually prepared as a mixture of isomers and referred to hereinafter as "1,4(or 5),8(or 9)-tris(hexadecylthio)cyclododecane", and equivalent terms; 2,9-bis(alkylthio)-p-menthane; 3,3'-bis (alkylthiopropyl) ether; 1,4,8-tris(alkylthio) cyclododecane; 1,5,8-tris(alkylthio)cyclododecane and 1,5,9-tris(alkylthio)cyclododecane, which are all usually prepared as a mixture of isomers and referred to hereinafter as "1,4(or 5),8(or 9)-tris(alkylthio)cyclododecane" and equivalent terms; pentaerythritol tetrakis(n-octadecylthiopropyl) ether; pentaerythritol tris(n-octadecylthiopropyl) ether; pentaerythritol tetrakis(n-dodecylthiopropyl) ether; pentaerythritol tris(n-dodecylthiopropyl) ether; trimethylolpropane tris(n-octadecylthiopropyl) ether; trimethylolpropane tris(n-hexyldecylthiopropyl) ether; dipentaerythritol hexakis n-octylthiopropyl) ether; dipentaerythritol hexakis(n-dodecylthiopropyl) ether; dipentaerythritol hexakis(n-hexyldecylthiopropyl) ether. The alkylthio group in each of the above classes of compounds contains about 2 to about 38 carbons and preferably, about 8 to about 20 carbons.

The weight ratios of organic peroxide to organic sulfide antioxidant is from about 100:1 to about b 1:100, and preferably, from about 50:1 to about 5:1.

The organic sulfide antioxidants may be contained in the present blends in amounts of from about 0.01 to about 5.0 and, preferably, from about 0.05 to about 0.5 parts by weight per hundred parts by weight of polymer. The organic peroxide is contained in an amount of about 10 to about 99 and preferably about 0.5 to about 5 parts by weight of polymer. When the present blends are used in combination with a thermoplastic or elastomeric resin, the resin is contained in the final composition in an amount of from about 30 to about 99 parts by weight When incorporated in a polymeric or thermoplastic resin, the present blends may be used in a synergistic combination with auxiliary antioxidants. The preferred auxiliary antioxidants are selected from the group consisting of hindered phenols, hindered amine light stabilizers, secondary amines and quinolines. More preferably, the auxiliary antioxidants are octadecyl 3-(3',5'-di-t-butyl-4'-hydroxyphenyl)propionate or tetrakis(methylene-3,5-di-t-butyl methane).

The weight ratio of organic sulfide antioxidant to auxiliary antioxidant is from about 1:10 to about 10:1, and preferably, from about 1:1 to about 3:1.

The present compositions of peroxide(s) and organic sulfide antioxidants may be prepared by simply blending together the ingredients, preferably at room temperature, until they are well dispersed. There are no critical processing parameters or equipment necessary, except that a build up of heat should be avoided to prevent or retard decomposition of the peroxide component.

The present blends may further contain one or more fillers or carriers. Fillers may be used in the present blends, e.g., as reinforcements, colorants, etc. Carriers are useful to absorb the organic peroxide prior to mixing the peroxide with the blend of the present invention and with the resin. For example, commonly used fillers, such as calcium carbonate, calcium silicate, silica and various grades of clay may be used. Also, polymeric carriers such as EPDM, EPM, polyolefin waxes and EVA may be also used as carriers. Incorporation of a carrier in these compositions is preferred when the organic peroxide is a liquid or a semicrystalline material in its natural state. Generally, about 40 to 50% of organic peroxide is incorporated onto carriers, such as those disclosed above.

In addition to the above-noted carriers, it is known in the art that polymeric compositions, including crosslinkable polymers, may comprise other materials which may act as fillers. Likewise, the peroxide-organic sulfide stabilizer of the present invention may also include fillers. Suitable fillers include, for example, carbon black, titanium dioxide, alkaline earth metal carbonates, and co-curing agents, such as triallylcyanurate, various methacrylates and acrylate compounds. Co-curing agents are materials which are used in combination with peroxides to increase the crosslinking efficiency of the peroxide by increasing the number of sites of unsaturation in the resin.

The thermoplastic and elastomeric compounds to which the present blends may be added are those which may be defined as natural or synthetic materials which are thermoplastic or elastomeric in nature, and which can be crosslinked through the action of a crosslinking agent. For example, reference can be made to *Rubber World*, "Elastomer Crosslinking with Diperoxyketals," pp. 26–32, (October, 1983), and *Rubber and Plastic News*, "Organic Peroxides for Rubber Crosslinking," pp. 46–50, (Sept. 29, 1980), discussing the crosslinking action of the crosslinking agent and the crosslinkable polymers and thermoplastics, the disclosures of which are incorporated herein by reference. Furthermore, various polyolefins may be crosslinked and stabilized with this invention, e.g., such as those described in *Modern Plastics Encyclopedia*, 89, pp. 63–67, 74–75 (1989), the disclosure of which is incorporated herein by reference Appropriate thermoplastic or elastomeric resins for use with the instant invention include, but are not limited to, the following: linear low density polyethylene, low density polyethylene, high density polyethylene, chlorinated polyethylene, ethylene-propylene terpolymers, ethylene vinyl acetate, ethylene-propylene copolymers and silicone rubber chlorosulfonated polyethylene. However, other polymers useful with the present blends will be evident to one skilled in the art based upon the present disclosure.

In addition, blends of two or more polymeric materials can be crosslinked and stabilized with the compositions of the present invention. Such blends of polymeric materials can be compounded individually or they may be blended simultaneously with the present blends of antioxidant and organic peroxide. However, it is preferred to preblend the polymeric materials with the compositions of the present invention, to eliminate compounding steps, to increase weighing accuracy and to provide ease of handling. Such preblending of polymeric materials may be done conveniently by extrusion, Banbury mixing, roll milling, etc. Other methods would be well known to those skilled in the art based upon the present disclosure.

As will be evident to one skilled in the art, the polymeric materials crosslinked and stabilized with the compositions of the present invention may further comprise other stabilizers, plasticizers, and processing oils to enhance their blending or end-use. The particular stabilizers, plasticizers, and processing oils, as well as the amounts in which they may be used, will be evident to one skilled in the art based upon the present disclosure.

The crosslinked compositions according to the present invention may be prepared by mixing or blending the mixture of the polymeric material with the peroxide and organic sulfide antioxidant composition by any conventional means as long as the polymeric material is in a melted state on blending or fluxing (mainly for elastomeric materials) and the temperature of the material is below the decomposition temperature of the peroxide.

Then, the mixture or blend is heat cured for a period of time sufficient to obtain the desired degree of crosslinking. The cure time is inversely related to the temperature. The heat curing has a temperature-time relationship which is primarily dependent on the polymeric compound and the amount and type of peroxide initiator present. The temperature-time relationship may be affected by the formulation of the compositions as a whole. For example, if various carriers and/or co-curing agents are used in the composition, the time and temperature required to heat cure the resin will be affected. Generally, the present compositions once mixed, are heat cured for a period equivalent to about 6 to about 8 half-lives of the organic peroxide initiator.

The heat curing or crosslinking may be carried out at temperatures of about 100° C. to about 315° C. or more. The preferred peroxide initiators of the present invention disclosed above heat cure efficiently at a preferred temperature of about 150° C. to about 260° C. for a period of about 0.5 to about 30 minutes.

The heat curing of these compositions may be carried out in any conventional manner known to those skilled in the art. For example, mold cures, oil bath cures, (where the presence of the oil does not harm the polymeric compound), oven cures, steam cures, or hot metal salt bath cures may be used. However, other methods of curing usable in the present invention will be evident to one skilled in the art based upon the present disclosure.

The present invention will now be further illustrated by reference to the following, specific, non-limiting examples.

EXAMPLES

Preparation

All formulations were compounded utilizing a C.W. Brabender Plastigraph with type-5 mixing blades. Mixing temperatures are specified below for various resin types.

| Resin Type | Temp °C. |
|---|---|
| High density polyethylene (HDPE) | 140 |
| Linear low density polyethylene (LLDPE) | 120 |
| Low density polyethylene (LDPE) | 120 |
| Ethylene-propylene terpolymers (EPDM) | 20 |

The specific parts per 100 parts of polymer used in each blend are listed in each example.

For compositions containing thermoplastic polymers, all components of the blend, except the polymer, were weighed to the desired parts by weight of polymer, placed into a three ounce wax paper cup, and mixed with a small metal spatula. 100 parts by weight of thermoplastic polymer were blended into the mixer at a mixing speed of 50 rpm, at the mixing temperature designated in the specific examples. The preweighed component mixture was then slowly added to the fluxing resin. The composition was then mixed for 3 minutes, after which the composition was removed and subsequently pressed into a flat plaque (of no specific thickness), using a room temperature Carver laboratory press (Model C). The plaque was then allowed to cool to room temperature.

For compositions comprising elastomeric polymers, all components except the elastomer, antioxidants and peroxides were weighed to the desired weight and placed into a three ounce waxed paper cup (cup 1) and mixed with a small metal spatula, (i.e., additives, such as carriers, co-curing agents, etc., if any). The organic sulfide and/or primary antioxidants and peroxide or peroxide blends, were then weighed in a second three ounce waxed paper cup (cup 2), and then mixed using a small metal spatula. 100 parts by weight of elastomer were fluxed into the C.W. Brabender Plastigraph at a mixing speed of 15 rpm. The contents of cup 1 were added and mixed until uniform. The contents of cup 2 were then slowly added to the mixer. The rpm was then increased to 30, and the composition was mixed for 2 minutes. The entire composition was then removed from the mixer and subsequently added slowly back to the mixer at a mixing speed of 20 rpm. The entire composition was further mixed for an additional 2 minutes. The composition was then removed and subsequently pressed into a flat plaque using a room temperature Carver laboratory press (Model C). There was no specific, required thickness of the plaque.

The flat plaque was then folded, and again pressed out. This procedure was repeated four times. The resulting plaque was then allowed to cool to room temperature.

Testing

Crosslinking evaluations were carried out on the prepared compositions with a Monsanto Oscillating Disk Rheometer (Model R-100).

The Monsanto Rheometer test procedure comprised enclosing an uncured sample of the composition under positive pressure, in a heated die cavity containing a biconical disk. The disk is oscillated (at 100 cycles/min) through an arc of 1°, 3° or 5°. The force (or torque) required to oscillate the disk is recorded as a function of time.

The recorded shear modulus is propor-tional to the extent of crosslinking of the sample and is a representation of the cure reaction. That is, increased shear modulus values recorded with the rheometer test procedure used, indicate an increased amount of crosslinking. Specifically, the shear modulus increases as the percent of crosslinking increases. The test variables recorded from the rheometer were:

$M_H$—Maximum torque (in-lbs): a measure of crosslinking attained.

$M_L$—Minimum torque (in-lbs): a measure of viscosity of the compound and an indicator of scorch. Scorch is the tendency of a compound to start curing before it is in the right form and place to be cured and generally is the result of premature vulcanization which may occur during the process of a thermoplastic or elastomeric compound due to accumulated effects of heat and time. Increased $M_L$ values are indicative of scorch.

$M_N$-$M_L$: the difference between the maximum and minimum torque values. This is useful in determining extent of crosslinking.

$T_{C90}$—Cure Time (mins): the time to reach 90% of maximum torque as defined by $(M_H-M_L)$ 0.9 + $M_L$.

$T_{S2}$—Scorch time (mins): the time required for torque to increase two inch-pounds above $M_L$.

The reported torque values were rounded off to the nearest whole number. Time values were rounded off to the nearest tenth of a minute Property retention evaluations, i.e., tensile strength and % elongation, were also carried out by the obtainment of physical property data. Thirty-eight to forty grams of the appropriate compounded composition were cured in a 5"×5"×0.075" mold in a Carver Laboratory Press (Model C). The cure temperature was the same as in the Monsanto Oscillating Disk Rheometer temperature illustrated in the appropriate examples. The maximum tensile strength (psi), and the percent elongation were determined on the Instron Model 4204 following the procedure set forth in the ASTM D-638, Die C test procedure. Samples from cured compositions were tested both before and after heat aging at specified temperatures for specified times, in a circulating oven.

The values set forth below in each example are the average of five test samples. The values are reported as the % retention of the initial property value. For example, if a maximum tensile strength average were 2570 psi, and after heat aging a maximum tensile value of 1285 psi was obtained in the same system, the reported value for the % retention of maximum tensile would be 50%.

EXAMPLE 1

Example 1 demonstrates that in a LDPE system, no adverse effect is seen on the crosslinking efficiency of a peroxide due to the use of an organic sulfide antioxidant. This conclusion is supported by the fact that equivalent Monsanto net torque values were observed for all of the blends evaluated. This indicates equivalent crosslink densities for blends having peroxide to antioxidant ratios of from 5:1 to 20:1.

The preparation and crosslinking determination tests used were the same as those described in the general experimental procedure.

The Monsanto rheometer test conditions were 185° C. and +3° arc.

| Formulation: | A | B | C | D |
|---|---|---|---|---|
| DYNH-1[1] (phr)* | 100 | 100 | 100 | 100 |
| LUPERCO 101-XL[2] (phr) | 4.2 | 4.2 | 4.2 | 4.2 |
| SAO(1)[3] (phr) | — | 0.4 | 0.2 | 0.1 |
| $M_H$-$M_L$ (in-lb) | 30 | 29 | 30 | 30 |
| $T_{C90}$ (min) | 7.0 | 7.1 | 7.0 | 7.0 |
| $T_{S2}$ (min) | 1.8 | 1.9 | 1.8 | 1.8 |

[1]DYNH-1 — LDPE from Union Carbide Corporation
[2]LUPERCO 101-XL — 2,5-Dimethyl-2,5-di(t-butyl-peroxy)hexane 45% on inert filler from Pennwalt Corporation, Lucidol Division
[3]SAO(1) — Beta (n-octadecylthio)ethyl-3 and 4-(n-octadecylthio)-cyclohexane from Pennwalt Corporation
*phr — parts per hundred resin

EXAMPLE 2

Example 2 demonstrates that no adverse effect is seen on the crosslinking efficiency of peroxide in a LLDPE system due to the use of an organic sulfide antioxidant. This is supported by the fact that equivalent net torque values are observed for the systems. This indicates equivalent crosslink densities for blends with ratios of peroxide to antioxidant of from 5:1 to 20:1. However, reduced torque values are observed when the conventional antioxidant, dilauryl thiodipropionate (DLTDP), is used as the secondary antioxidant compared at equal weight levels, to the compositions containing the beta(n-octadecylthio)ethyl-3 and -4-(n-octadecylthio)cyclohexane antioxidants according to the present invention. Reduced torque values are indicative of lower crosslink density.

The preparation of the compositions and the crosslinking determination tests followed were the same as set forth in the general experimental procedure above.

The rheometer test conditions were 185° C. and +3 arc.

| Formulation: | A | B | C | D | E |
|---|---|---|---|---|---|
| DFDA-7530[1] (phr)* | 100 | 100 | 100 | 100 | 100 |
| LUPERCO 101-XL[2] (phr) | 4.2 | 4.2 | 4.2 | 4.2 | 4.2 |
| DLTDP[2] (phr) | — | 0.4 | — | — | — |
| SAO(1) (phr) | — | — | 0.4 | 0.2 | 0.1 |
| $M_H$-$M_L$ (in-lb) | 79 | 63 | 78 | 78 | 79 |
| $T_{C90}$ (min) | 7.8 | 8.4 | 7.7 | 7.8 | 7.8 |
| $T_{S2}$ (min) | 1.2 | 1.5 | 1.2 | 1.2 | 1.3 |

[1]DFDA-7530 — LLDPE From Union Carbide Corporation
[2]DLTDP — Dilauryl Thiodipropionate

EXAMPLE 3

Example 3 demonstrates that unexpectedly, a 10:1 blend of 2,5-dimethyl-2,5-di(t-butylperoxy)hexyne-3 and beta(n-octadecylthio)ethyl-3 and -4-(n-octadecylthio)cyclohexane provides equivalent cure characteristics to 2,5-dimethyl-2,5-di(t-butylperoxy)hexyne-3 alone in LLDPE, as shown by torque rheometer values. Blends of other commercial secondary antioxidants with the peroxide (i.e., columns C and D) show a reduction in torque values compared to the control, indicating a reduction in the crosslink density of these systems The preparation and crosslinking determination test followed were the same as in the general experimental procedure set forth above.

The rheometer test conditions were 198° C. +3° arc.

| Formulation: | A | B | C | D |
|---|---|---|---|---|
| DFDA-7530 (phr) | 100 | 100 | 100 | 100 |
| LUPERCO 130-XL[1] (phr) | 4.44 | 4.44 | 4.44 | 4.44 |
| SAO(1) (phr) | — | 0.2 | — | — |
| DLTDP (phr) | — | — | 0.2 | — |
| IRGAFOS 168[2] (phr) | — | — | — | 0.2 |
| $M_H$-$M_L$ (in-lb) | 87 | 87 | 78 | 73 |
| $T_{C90}$ (min.) | 6.6 | 6.9 | 6.4 | 7.2 |
| $T_{S2}$ (min.) | 1.1 | 1.1 | 1.1 | 1.2 |

[1]LUPERCO 130-XL — 2,5-dimethyl-2,5-di(t-butyl-peroxy)hexyne-3 45% on inert filler, from Pennwalt Corporation, Lucidol Division
[2]IRGAFOS 168 — Tris(2,4-di-t-butylphenyl)-phosphite from Ciba-Giegy Corporation

EXAMPLE 4

Example 4 illustrates that a 5:1 blend of alpha, alpha'-bis[(t-butylperoxy)isopropyl]benzene, beta(n-octadecyl-thio)ethyl-3 and -4-(n-octadecylthio)cyclohexane and a primary antioxidant, provides cure characteristics equivalent to alpha,alpha'-bis(t-butylperoxy)diisopropyl-benzene alone in LLDPE crosslinked with peroxide as shown by torque rheometer values. Blends of the primary antioxidants and conventional secondary antioxidants (i.e., columns C and D) show a reduction in the crosslink density of the systems.

The preparation of the compositions and the crosslinking determination tests followed were the same as those set forth in the general experimental procedure above.

The rheometer test conditions were 186° C. and +3° arc.

| Formulation: | A | B | C | D |
|---|---|---|---|---|
| DFDA-7530 (phr) | 100 | 100 | 100 | 100 |
| IRGANOX 1010[1] (phr) | 0.2 | 0.2 | 0.2 | 0.2 |
| LUPERCO 802-40KE[2] (phr) | 5.0 | 5.0 | 5.0 | 5.0 |
| SAO(1) (phr) | — | 0.4 | — | — |
| DLTDP (phr) | — | — | 0.4 | — |
| IRGAFOS 168 (phr) | — | — | — | 0.4 |
| $M_H$-$M_L$ (in-lb.) | 66 | 65 | 61 | 60 |
| $T_{C90}$ (min.) | 5.9 | 6.0 | 6.1 | 6.1 |
| $T_{S2}$ (min.) | 1.1 | 1.2 | 1.2 | 1.2 |

[1]IRGANOX 1010 — Tetrakis[methylene(3,5-di-t butyl-4-hydroxyhydro cinnamate)]methane from (Ciba-Geigy Corporation
[2]LUPERCO 802-40KE — alpha,alpha'-bis[(t-butyl-peroxy) isopropyl]benzene 40% on inert filler from Pennwalt Corporation Lucidol Division

EXAMPLE 5

Example 5 illustrates that a 5:1 blend of dicumyl peroxide, and beta(n-octadecylthio)ethyl-3 and -4-(n-octadecylthio)cyclohexane, in the presence of a primary antioxidant, provides cure characteristics equivalent to dicumyl peroxide alone in LLDPE as shown by torque rheometer values. Blends of other commercial secondary antioxidants and peroxide (i.e., columns C and D) show a reduction in torque values as compared to the control, indicating a reduction in the crosslink density of the systems.

The preparation of the compositions and the crosslinking determination tests followed were the same as set forth in the general experimental procedure above.

The rheometer test conditions were 185° C. and +3 arc.

| Formulation: | A | B | C | D |
|---|---|---|---|---|
| DFDA-7530 (phr) | 100 | 100 | 100 | 100 |
| IRGANOX 1010 (phr) | — | 0.2 | 0.2 | 0.2 |
| LUPEROX 500R[1] (phr) | 2.0 | 2.0 | 2.0 | 2.0 |
| SAO(1) (phr) | — | 0.4 | — | — |
| DLTDP (phr) | — | — | 0.4 | — |
| IRGAFOS 168 (phr) | — | — | — | 0.4 |
| $M_H$-$M_L$ (in-lb.) | 56 | 56 | 47 | 50 |
| $T_{C90}$ (min.) | 4.6 | 4.7 | 5.1 | 4.7 |
| $T_{S2}$ (min.) | 1.1 | 1.1 | 1.1 | 1.1 |

[1]LUPEROX 500R — 99% dicumyl peroxide from Pennwalt Corporation Lucidol Division

EXAMPLE 6

Example 6 illustrates that a 10:1 blend of 2,5-dimethyl-2,5-di(t-butylperoxy)hexyne-3 and beta(n-octadecylthio)ethyl-3 and -4-(n-octadecylthio)cyclohexane provides the equivalent cure characteristics of 2,5-dimethyl-di(t-butylperoxy)-hexyne-3 alone in HDPE, as shown by torque rheometer values. Blends of other commercial secondary antioxidants and the peroxide (i.e., columns C and D) show a reduction in torque values as compared to the control, indicating a reduction in the crosslink density of the systems.

The preparation of the compositions and the crosslinking determination tests followed were the same as set forth in the general experimental procedure above.

The rheometer test conditions were 196° C. and +3° arc.

| Formulation: | A | B | C | D |
|---|---|---|---|---|
| USI LY66000 (phr) | 100 | 100 | 100 | 100 |
| LUPERCO 130-XL (phr) | 4.44 | 4.44 | 4.44 | 4.44 |
| SAO(1) (phr) | — | 0.2 | — | — |
| DLTDP (phr) | — | — | 0.2 | — |
| IRGAFOS 168 (phr) | — | — | — | 0.2 |
| MH-ML (in-lb.) | 56 | 57 | 51 | 51 |
| TC90 (min.) | 6.1 | 6.2 | 6.3 | 6.0 |

| Formulation: | A | B | C | D |
|---|---|---|---|---|
| TS2 (min.) | 1.5 | 1.5 | 1.5 | 1.4 |

[1] LY66000 — HDPE from U.S.I. Corporation

EXAMPLE 7

Example 7 illustrates the superior tensile retention properties of blends of beta(n-octadecylthio)ethyl-3 and -4-(n-octdecylthio)cyclohexane and 2,5-dimethyl-2,5-di(t-butylperoxy)hexyne-3, as compared to peroxide alone and blends of peroxide and commercial secondary antioxidants in LLDPE after heat aging.

Samples were prepared in the same manner as described in the general experimental procedure set forth above.

Samples were aged at 121° C. for 14 days, and tested as set forth above.

| Formulation: | A | B | C | D |
|---|---|---|---|---|
| DFDA-7530 (phr) | 100 | 100 | 100 | 100 |
| LUPERCO 130-XL (phr) | 4.44 | 4.44 | 4.44 | 4.44 |
| SAO(1) (phr) | — | 0.2 | — | — |
| DLTDP (phr) | — | — | 0.2 | — |
| IRGAFOS 168 (phr) | — | — | — | 0.2 |
| AFTER HEAT AGING AT 121° C., 14 DAYS | | | | |
| TENSILE STRENGTH (max) % RETAINED | 15 | 70 | 35 | 25 |
| ELONGATION: % RETAINED | 15 | 100 | 25 | 15 |

EXAMPLE 8

Example 8 illustrates the superior tensile retention properties of blends of beta(n-octadecylthio)ethyl-3 and -4-(n-octadecylthio)cyclohexane and dicumyl peroxide in the presence of a phenolic antioxidant, as compared to both peroxide alone and blends of peroxide and commercial secondary antioxidants in LLDPE after heat aging.

Samples were prepared in the same manner as described in the general experimental procedure above.

Samples were aged at 150° C. for 14 days and tested by as set forth above.

| Formulation: | A | B | C | D |
|---|---|---|---|---|
| DFDA-7530 (phr) | 100 | 100 | 100 | 100 |
| IRGANOX 1010 (phr) | — | 0.2 | 0.2 | 0.2 |
| LUPEROX 500R[1] (phr) | 2.0 | 2.0 | 2.0 | 2.0 |
| SAO(1) (phr) | — | 0.4 | — | — |
| DLTDP (phr) | — | — | 0.4 | — |
| IRGAFOS 168 (phr) | — | — | — | 0.4 |
| AFTER HEAT AGING AT 150° C., 14 DAYS | | | | |
| TENSILE STRENGTH (max) % RETENTION | 25 | 75 | 45 | 25 |
| ELONGATION % RETENTION | 1 | 100 | 55 | 1 |

EXAMPLE 9

Example 9 illustrates improved tensile retention properties of 10:1 blends of 2,5-dimethyl-2,5-di(t-butylperoxy) hexyne-3 and beta(n-octadecylthio)ethyl-3 and -4-(n-octdecylthio)cyclohexane as compared to both peroxide alone and blends of peroxide and commercial secondary antioxidants in HDPE after heat aging.

Samples were prepared in the same manner as described in the general experimental procedure set forth above.

Samples were aged at 121° C. for 3 days and tested as set forth above.

| Formulation: | A | B | C | D |
|---|---|---|---|---|
| USI LY66000 (phr) | 100 | 100 | 100 | 100 |
| LUPERCO 130-XL (phr) | 4.44 | 4.44 | 4.44 | 4.44 |
| SAO(1) (phr) | — | 0.2 | — | — |
| DLTDP (phr) | — | — | 0.2 | — |
| IRGAFOS 168 (phr) | — | — | — | 0.2 |
| AFTER HEAT AGING 3 DAYS AT 121° C. | | | | |
| TENSILE STRENGTH (max) % RETENTION | 63 | 98 | 100 | 72 |
| ELONGATION % RETENTION | 1 | 30 | 10 | 1 |

EXAMPLE 10

Example 10 demonstrates the improved tensile retention properties of blends of beta(n-octadecylthio)ethyl-3 and -4-(n-octdecylthio)cyclohexane and compared to both peroxide alone and blends of peroxide and commercial secondary antioxidants in the presence of a primary antioxidant in LLDPE after heat aging.

Samples were prepared in the same manner as described in the general experimental procedure above.

Samples were aged at 121° C. for 14 days and tested as set forth above.

| Formulation: | A | B | C | D |
|---|---|---|---|---|
| DFDA-7530 (phr) | 100 | 100 | 100 | 100 |
| LUPERCO 802-40K (phr) | 5.0 | 5.0 | 5.0 | 5.0 |
| IRGANOX 1010 (phr) | — | 0.2 | 0.2 | 0.2 |
| SAO(1) (PHR) | — | 0.4 | — | — |
| DLTDP (phr) | — | — | 0.4 | — |
| IRGAFOS 168 (phr) | — | — | — | 0.4 |
| AFTER HEAT AGING 14 DAYS AT 150° C. | | | | |
| TENSILE STRENGTH (max) % RETENTION | 30 | 90 | 90 | 30 |
| ELONGATION % RETENTION | 5 | 100 | 75 | 10 |

EXAMPLE 11

Example 11 demonstrates the stability of various 10:1 blends of peroxide and beta(n-octadecylthio)ethyl-3 and -4-(n-octdecylthio)cyclohexane. Samples were prepared and stored at the temperature and for the length of time indicated below. Assays were then determined. The percentage loss as % assay is listed in the table below. The results show a negligible assay loss for each of the systems tested.

| | STORAGE TEMPERATURE | | | | | |
|---|---|---|---|---|---|---|
| | 40° C. | | | 50° C. | | |
| | WEEKS | | | | | |
| | 2 | 4 | 8 | 2 | 4 | 8 |
| 130-XL/SAO(1) INITIAL ASSAY 45.4% LOSS | 0.4 | 0.9 | 3.3 | 1.1 | 1.3 | 3.3 |
| 231-XL[1]/SAO(1) INITIAL ASSAY 39.7% LOSS | — | 2.7 | NL | — | NL | NL |
| 500-40KE[2]/SAO(1) INITIAL ASSAY 37.2% LOSS | NL | NL | NL | 1.3 | 0.8 | 2.4 |

-continued

| | STORAGE TEMPERATURE | | | | |
|---|---|---|---|---|---|
| | 40° C. | | 50° C. | | |
| | WEEKS | | | | |
| | 2 | 4 | 8 | 2 | 4 | 8 |
| 802-40KE/SAO(1) INITIAL ASSAY 36.3% LOSS | NL | NL | NL | 1.3 | NL | NL |

[1]LUPERCO 231-XL — 1,1-di(t-butylperoxy)3,3,5-trimethyl cyclohexane 40% on inert filler from Pennwalt Corporation Lucidol Division
[2]LUPERCO 500-40KE — 40% dicumyl peroxide on inert filler from Pennwalt Corporation Lucidol Division
[3]NL — No loss

EXAMPLE 12

This example illustrates that unexpectedly a 2.7:1 blend of dicumyl peroxide and beta(n-octadecylthio)ethyl-3 and -4-(n-octadecylthio)cyclohexane provides the equivalent cure characteristics of dicumyl peroxide alone in an EPDM resin as shown in Monsanto Torque rheometer values. The preparation and crosslinking determination tests are the same as in the general experimental procedure. The Monsanto rheometer conditions were b 177° C., +3° arc.

| Formulation: | A | B |
|---|---|---|
| Epsyn 55 (phr)* | 100 | 100 |
| Luperox 500R (phr) | 2.7 | 2.7 |
| SAO(1) (phr) | — | 1.0 |
| $M_H$ (in-lb) | 119 | 117 |
| $M_H$-$M_L$ (in-lb) | 104 | 102 |
| $T_{C90}$ (min) | 6.5 | 6.3 |
| $T_{S2}$ (min) | 0.9 | 0.9 |

*Epsyn 55 — EPDM from Copolymer, Inc.

The present invention may be embodied in other specific forms without departing from the spirit or essential attributes thereof and, accordingly, reference should be made to the appended claims, rather than to the foregoing specification as indicating the scope of the invention.

We claim:

1. A composition for crosslinking and stabilizing a thermoplastic or polymeric resin comprising an organic peroxide; and an organic sulfide antioxidant of Formula I, II or III:

$$R(OCH_2CHCHSR^3)_n \quad (I)$$
$$\phantom{R(OCH_2CH}R^1\phantom{C}R^2$$

$$O(CH_2CHCHSR^3)_2 \quad (II)$$
$$\phantom{O(CH_2C}R^1\phantom{C}R^2$$

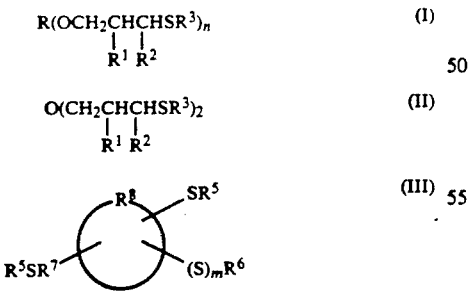   (III)

wherein:
m is 0 or 1;
n is an integer of 2 to 15;
R is a substituted or unsubstituted alkyl group of 2 to 30 carbons, a substituted or unsubstituted cycloalkyl group of 5 to 20 carbons, a substituted or unsubstituted alkyl group of 2 to 30 carbons where any of up to 6 carbon atoms are replaced with an O or S heteroatom, a substituted or unsubstituted cycloalkyl group of 5 to 20 carbons where any of up to 6 carbon atoms are replaced with an O or S heteroatom, with the proviso that the heteroatoms must be separated from each other and from the portion of the compound to which the R group is bonded by at least one carbon atom, the substituents for R being —OH, —SR[4] or —OR[4], wherein R[4] is an alkyl group of 1 to 30 carbons or cycloalkyl group of 5 to 20 carbons;

$R^1$ and $R^2$ are independently H or an alkyl group of 1 to 4 carbons;

$R^3$ is an alkyl group of 1 to 24 carbons or a cycloalkyl group of 5 to 20 carbons;

$R^5$ is an alkyl group of 1 to 24 carbons;

$R^6$ is H or an alkyl group of 1 to 24 carbons, with the provisos that when m=0, $R^6$ is H or an alkyl group of 1 to 7 carbons and when m=1, $R^6$ is an alkyl group of 1 to 24 carbons;

$R^7$ is a direct bond or an alkylene group of 1 to 4 carbons; and $R^8$ is a monocyclic, bicyclic or tricyclic cycloalkyl group of 5 to 16 carbons.

2. A composition as in claim 1, wherein the organic sulfide antioxidant is represented by Formula I or II, wherein R is:

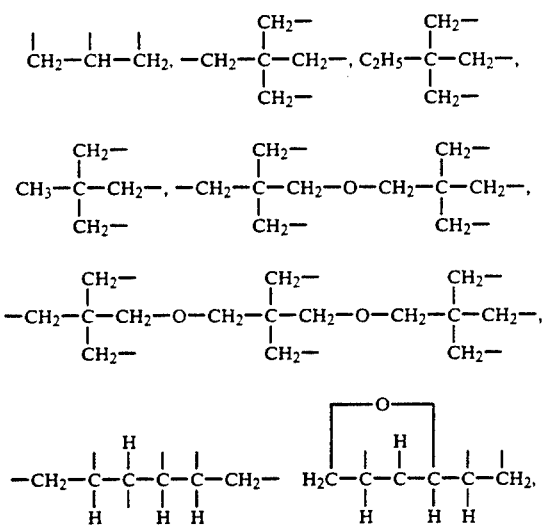

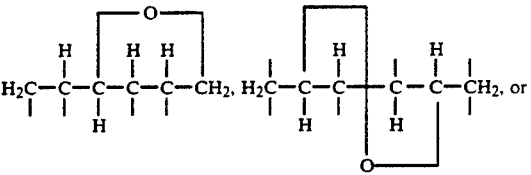

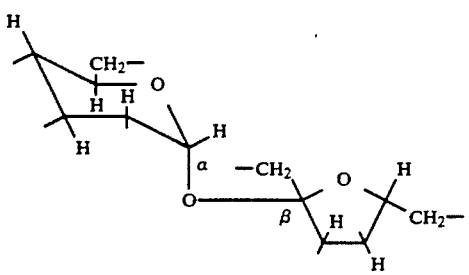

where α and β are the types of linkages; and wherein $R^1$ is H or —CH$_3$;

R² is H; and

R³ is an alkyl group of 10 to 18 carbons.

3. A composition as in claim 2, wherein R is:

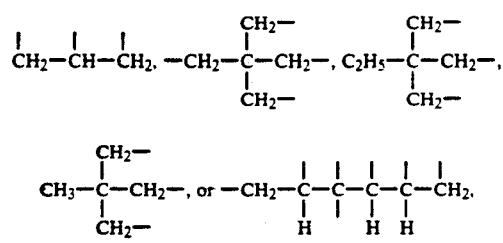

wherein

R¹ and R² are H; and

R³ is an alkyl group of 12 to 18 carbons.

4. A composition as in claim 1, wherein the organic sulfide antioxidant is represented by Formula III and has one of the following structures:

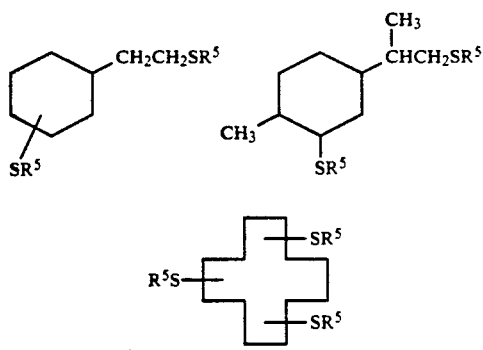

5. A composition as in claim 1, wherein the organic peroxide is selected from the group consisting of peroxyketals, dialkyl peroxides, peroxyesters, monoperoxy carbonates, diacyl peroxides and solid peroxydicarbonates.

6. A composition as in claim 1, further comprising thermoplastic or elastomeric resin.

7. A composition as in claim 6, wherein the thermoplastic or elastomeric resin is selected from the group consisting of ethylene vinyl acetate, linear low density polyethylene, low density polyethylene, high density polyethylene, chlorinated polyethylene, chlorosulfonated polyethylene, ethylene-propylene terpolymer, ethylene-propylene copolymers, silicon rubber, 1,4-polybutadiene, nitrile rubber, hydrogenated nitrile rubber and butyl rubber.

8. A composition as in claim 1, further comprising one or more auxiliary antioxidants selected from the group consisting of hindered phenols, hindered amine light stabilizers, secondary amines and quinolines.

9. A composition as in claim 1, containing the organic peroxide in an amount of from about 10 to about 99 parts by weight.

10. A composition as in claim 1, containing the organic sulfide antioxidant in an amount of from about 0.01 to about 5 parts by weight of the polymeric or thermoplastic resin.

11. A composition as in claim 10, containing the organic sulfide antioxidant in an amount of from about 0.05 to about 0.5 parts by weight of the thermoplastic o elastomeric resin.

12. A composition as in claim 8, wherein the ratio of the organic sulfide antioxidant to the auxiliary antioxidant is from about 1:10 to about 10:1.

13. A composition as in claim 12, wherein the ratio of organic sulfide antioxidant to the auxiliary antioxidant is from about 1:1 to about 3:1.

14. A composition as in claim 1, further comprising a filler.

15. A composition as in claim 14, wherein the filler is selected from the group consisting of carbon black, titanium dioxide, alkaline earth metal carbonates, co-curing agents, stabilizers, plasticizers and processing aids.

16. A composition as in claim 15, wherein the co-curing agent is selected from the group consisting of triallylcyanurate, methacrylate and acrylate.

17. A process for crosslinking and stabilizing a thermoplastic or elastomeric resin comprising adding to the resin a composition comprising an organic peroxide and an organic sulfide antioxidant to form a resultant composition; and heat curing the resultant composition at a temperature and for a period of time sufficient to obtain a predetermined degree of crosslinking, wherein the organic sulfide antioxidant is represented by Formula I, II or III:

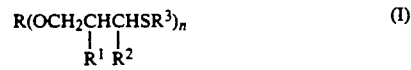

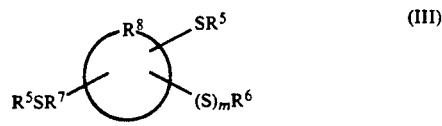

wherein:

m is 0 or 1;

n is an integer of 2 to 15;

R is a substituted or unsubstituted alkyl group of 2 to 30 carbons, a substituted or unsubstituted cycloalkyl groups of 5 to 20 carbons, a substituted or unsubstituted alkyl group of 2 to 30 carbons where any of up to 6 carbon atoms are replaced with an O or S heteroatom, a substituted or unsubstituted cycloalkyl group of 5 to 20 carbons where any of up to 6 carbon atoms are replaced with an O or S heteroatom, with the provisio that the heteroatoms must be separated from each other and from the portion of the compound to which the R group is bonded by at least one carbon atom, the substituents for R being —OH, —SR⁴ or —OR⁴, wherein R⁴ is an alkyl group of 1 to 30 carbons or a cycloalkyl group of 5 to 20 carbons;

R¹ and R² are independently H or an alkyl group of 1 to 4 carbons;

R³ is an alkyl group of 1 to 24 carbons or a cycloalkyl group of 5 to 20 carbons;

R⁵ is an alkyl group of 1 to 24 carbons;

R⁶ is H or an alkyl group of 1 to 24 carbons, with the provisos that when m=0, R⁶ is H or an alkyl group of 1 to 7 carbons and when m=1, R⁶ is an alkyl group of 1 to 24 carbons;

R⁷ is a direct bond or an alkylene group of 1 to 4 carbons; and

R⁸ is a monocyclic, bicyclic or tricyclic cycloalkyl group of 5 to 16 carbons.

18. A process as in claim 17, wherein the resultant composition is heat cured for about 6 to about 8 half-lives of the organic peroxide.

19. A process as in claim 17, wherein the resultant composition is heat cured at a temperature of about 100° to about 315° C.

20. A process as in claim 17, wherein the organic peroxide is selected from the group consisting of peroxyketals, dialkyl peroxides, peroxyesters, monoperoxy carbonates, diacylperoxides and solid peroxy dicarbonates.

21. A process as in claim 17, wherein the thermoplastic or elastomeric resin is selected from the group consisting of ethylene vinyl acetate, linear low density polyethylene, low density polyethylene, high density polyethylene, chlorinated polyethylene, chlorosulfonated polyethylene, ethylene-propylene terpolymers, ethylene-propylene copolymers, silicone rubber, 1,4-polybutadiene, nitrile rubber, hydrogenated nitrile rubber and butyl rubber.

22. A process as in claim 17, further comprising adding to the resultant composition an auxiliary antioxidant.

23. A method as in claim 17, wherein the organic sulfide antioxidant is represented by Formula I or II wherein R is:

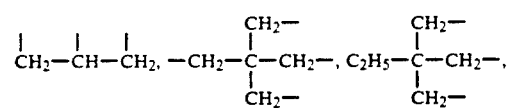

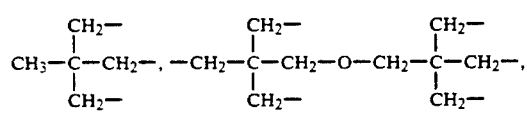

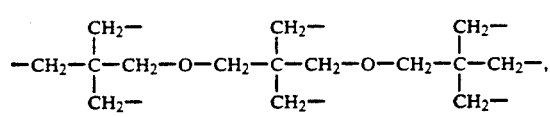

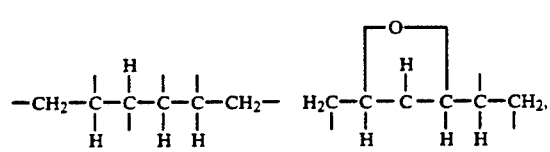

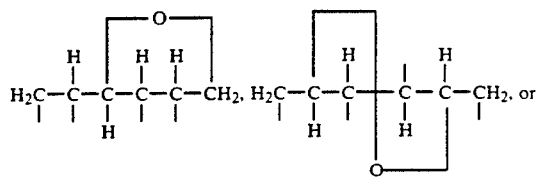

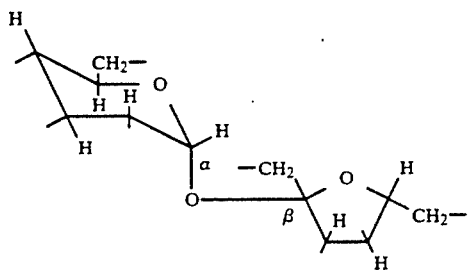

where α or β are the types of linkages; and wherein
R¹ is H or —CH₃;
R² is H; and
R³ is an alkyl group of 10 to 18 carbons.

24. A method as in claim 23, wherein R is:

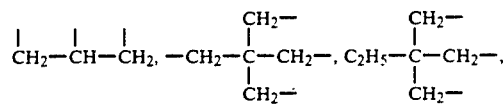

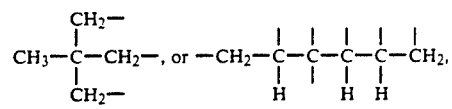

wherein
R¹ and R² are H; and
R³ is an alkyl group of 12 to 18 carbons.

25. A method as in claim 17, wherein the organic sulfide antioxidant is represented by Formula III and has one of the following structures:

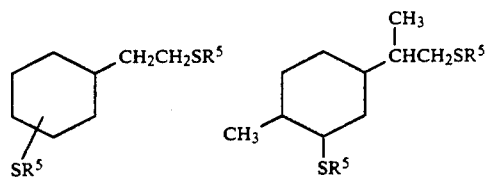

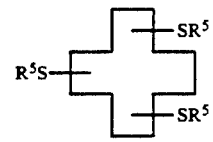

* * * * *